US010567956B2

(12) United States Patent
Li

(10) Patent No.: US 10,567,956 B2
(45) Date of Patent: Feb. 18, 2020

(54) DATA COMMUNICATION METHOD AND SYSTEM

(71) Applicant: TENDYRON CORPORATION, Beijing (CN)

(72) Inventor: Ming Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 16/318,362

(22) PCT Filed: Aug. 4, 2017

(86) PCT No.: PCT/CN2017/096028
§ 371 (c)(1),
(2) Date: Jan. 16, 2019

(87) PCT Pub. No.: WO2018/024251
PCT Pub. Date: Feb. 8, 2018

(65) Prior Publication Data
US 2019/0253882 A1 Aug. 15, 2019

(30) Foreign Application Priority Data

Aug. 5, 2016 (CN) .......................... 2016 1 0639420
Aug. 5, 2016 (CN) .......................... 2016 1 0639442

(51) Int. Cl.
H04W 12/06 (2009.01)
H04W 12/00 (2009.01)
(Continued)

(52) U.S. Cl.
CPC ....... *H04W 12/0017* (2019.01); *H04W 12/02* (2013.01); *H04W 12/04033* (2019.01);
(Continued)

(58) Field of Classification Search
CPC .................................................. H04W 12/003
See application file for complete search history.

(56) References Cited

U.S. PATENT DOCUMENTS

2012/0249296 A1* 10/2012 Savry ................... G06K 7/0008
340/5.65
2012/0280794 A1* 11/2012 Parrault .............. H04L 25/4906
340/10.1

(Continued)

FOREIGN PATENT DOCUMENTS

CN 103353597 A 10/2013
CN 103870868 A 6/2014

OTHER PUBLICATIONS

Xin, Wei; "Research on the Security and Privacy Issues in RFID-Based Supply Chain"; China Doctoral Dissertations; No. 10; Chapter Six; Oct. 2013; 148 pages (contains English Abstract see p. vii, vii an ix).

(Continued)

Primary Examiner — Sulaiman Nooristany
(74) Attorney, Agent, or Firm — BakerHostetler

(57) ABSTRACT

The present disclosure provides a data communication method and system. A first terminal continuously generates communication carrier signals during communication with a second terminal. The first terminal sends a communication data signal carrying a data packet to be processed, and begins to detect a first phase difference between a waveform phase of the communication carrier signal and a first initial phase once completing sending the data packet. The second terminal receives the communication data signal carrying the data packet to be processed, and begins to detect a second phase difference between the waveform phase of the communication carrier signal and a second initial phase once completing receiving the data packet, and sends a reply packet to the first terminal only when the second phase (Continued)

difference reaches $\Delta\varphi$. The first terminal only allows the system to start receiving the replay packet when the first phase difference is within a threshold range.

17 Claims, 3 Drawing Sheets

(51) Int. Cl.
*H04W 12/10* (2009.01)
*H04W 12/02* (2009.01)
*H04W 12/04* (2009.01)
*H04W 72/04* (2009.01)
*H04W 88/04* (2009.01)

(52) U.S. Cl.
CPC ........... *H04W 12/06* (2013.01); *H04W 12/10* (2013.01); *H04W 72/0446* (2013.01); *H04W 88/04* (2013.01)

(56) References Cited

U.S. PATENT DOCUMENTS

2013/0215788 A1 8/2013 He et al.
2015/0264570 A1 9/2015 Vaudenay et al.

OTHER PUBLICATIONS

Xin et al.; "Analysis and Design of Distance-Bounding Protocols for RFID"; Journal of Computer Research and Development; vol. 50(11); Nov. 2013; p. 2358-2366 (contains English Abstract).
International Patent Application No. PCT/CN2017/096028; Int'l Written Opinion and Search Report; dated Oct. 25, 2017; 8 pages.

\* cited by examiner

DATA COMMUNICATION METHOD AND SYSTEM

CROSS REFERENCE TO RELATED APPLICATIONS

This application is a U.S. national phase application of International Application No. PCT/CN2017/096028, filed on Aug. 4, 2017, which is based on and claims priority to Chinese patent applications Serial No. 201610639442.X filed on Aug. 5, 2016, and Serial No. 201610639420.3 filed on Aug. 5, 2016, the entire contents of which are incorporated herein by reference.

FIELD

The present disclosure relates to the field of electronic technology, and more particularly, to a data communication method and system.

BACKGROUND

The reading scheme of the existing contactless IC card reader is sending data based on communication protocols such as 14443 and 15693. According to the above protocols, a frame waiting time (FWT) exists after the reader sends instruction data, which indicates a maximum time range for the card reader to wait to receive response data. That is, after the card reader sends an instruction to a card, the card reader waits to receive the response data of the card, and the card reader considers the returned data to be legal as long as the data is returned within the frame waiting time (FWT). According to the above communication protocols, if a third party intercepts the data sent by the card reader and returns the response data within the FWT time, the card reader will consider the source of the data to be reliable. Thus, it can be seen that the solution has security risks, such as being attacked by a third party or data being altered.

SUMMARY

The present disclosure aims to solve at least one of the above problems.

The main objective of the present disclosure is to provide a data communication method.

Another objective of the present disclosure is to provide a data communication system.

In order to achieve the above objectives, the technical solution of the present disclosure is specifically realized as follows.

In one aspect, the present disclosure provides a data communication method, including: a first terminal continuously generating communication carrier signals during communication between the first terminal and a second terminal. The method includes: the first terminal sending a communication data signal carrying a data packet to be processed; when the first terminal completes sending the data packet to be processed, the first terminal beginning to detect a first phase difference between a waveform phase of the communication carrier signal with a first initial phase, in which the first initial phase is the waveform phase of the communication carrier signal once the first terminal completes sending the data packet to be processed, the communication data signal is obtained by the first terminal by means of modulating the data packet to be processed onto the communication carrier signal; the second terminal receiving the communication data signal carrying the data packet to be processed; when the second terminal completes receiving the data packet to be processed, the second terminal beginning to detect a second phase difference between the waveform phase of the communication carrier signal and a second initial phase, and generating a reply packet based on the data packet to be processed, in which, the second initial phase is the waveform phase of the communication carrier signal when the second terminal completes receiving the data packet to be processed; the second terminal sending the reply packet to the first terminal when detecting that the second phase difference reaches a threshold phase difference $\Delta\varphi$; when detecting that the first phase difference is within a threshold range, the first terminal allowing to start receiving the reply packet, in which, the threshold range is obtained by the first terminal based on the threshold phase difference $\Delta\varphi$.

Another objective of the present disclosure is to provide a data communication system, including at least a first terminal and a second terminal, characterized in that the first terminal continuously generates communication carrier signals during communication between the first terminal and the second terminal. The first terminal is configured to: send a communication data signal carrying a data packet to be processed; begin to detect a first phase difference between a waveform phase of the communication carrier signal and a first initial phase when the first terminal completes sending the data packet to be processed, in which the first initial phase is the waveform phase of the communication carrier signal when the first terminal completes sending the data packet to be processed, and the communication data signal is obtained by the first terminal by means of modulating the data packet to be processed onto the communication carrier signal. The second terminal is configured to: receive the communication data signal carrying the data packet to be processed; when the second terminal completes receiving the data packet to be processed, begin to detect a second phase difference between the waveform phase of the communication carrier signal and a second initial phase and generate a reply packet based on the data packet to be processed, in which the second initial phase is the waveform phase of the communication carrier signal when the second terminal completes receiving the data packet to be processed. The second terminal is further configured to send the reply packet to the first terminal when detecting that the second phase difference reaches a threshold phase difference $\Delta\varphi$. The first terminal is further configured to allow to start receiving the reply packet when the first phase difference is within a threshold range, in which, the threshold range is obtained by the first terminal based on the threshold phase difference $\Delta\varphi$.

In another aspect, the present disclosure further provides a data communication method, including: a first terminal continuously generating communication carrier signals during communication between the first terminal and a second terminal. The method includes: the first terminal sending a communication data signal carrying a data packet to be processed; when the first terminal completes sending the data packet to be processed, the first terminal beginning to detect a first phase difference between a waveform phase of the communication carrier signal with a first initial phase, in which the first initial phase is the waveform phase of the communication carrier signal once the first terminal completes sending the data packet to be processed, the communication data signal is obtained by the first terminal by means of modulating the data packet to be processed onto the communication carrier signal; the second terminal receiving the communication data signal carrying the data packet to be processed; when the second terminal completes receiving the data packet to be processed, the second terminal beginning to detect a second phase difference between the waveform phase of the communication carrier signal and a second initial phase, and generating a reply packet based on the data packet to be processed, in which, the second initial phase is the waveform phase of the communication carrier signal when the second terminal completes receiving the data packet to be processed; the second terminal sending the reply packet to the first terminal when detecting that the second phase difference reaches a threshold phase difference $\Delta\varphi$; when detecting that the first phase difference reaches the threshold phase difference $\Delta\varphi$, the first terminal allowing to start receiving the reply packet.

In another aspect, the present disclosure further provides a data communication system, including a first terminal and a second terminal, characterized in dial the first terminal continuously generates communication carrier signals during communication between the first terminal and the second terminal. The first terminal is configured to: send a communication data signal carrying a data packet to be processed; begin to detect a first phase difference between a waveform phase of the communication carrier signal and a first initial phase when the first terminal completes sending the data packet to be processed, in which the first initial phase is the waveform phase of the communication carrier signal when the first terminal completes sending the data packet to be processed, and the communication data signal is obtained by the first terminal by means of modulating the data packet to be processed onto the communication carrier signal. The second terminal is configured to: receive the communication data signal carrying the data packet to be processed; when the second terminal completes receiving the data packet to be processed, begin to detect a second phase difference between the waveform phase of the communication carrier signal and a second initial phase and generate a reply packet based on the data packet to be processed, in which the second initial phase is the waveform phase of the communication carrier signal when the second terminal completes receiving the data packet to be processed. The second terminal is further configured to send the reply packet to the first terminal when detecting that the second phase difference reaches a threshold phase difference $\Delta\varphi$. The first terminal is further configured to allow to start receiving the reply packet when the first phase difference reaches the threshold phase difference $\Delta\varphi$.

It can be seen from the above technical solutions that, with the data communication method and system provided by the present disclosure, the first terminal begins to detect the first phase difference between the waveform phase of the communication carrier signal and the first initial phase when the first terminal completes sending the data packet to be processed, and receives the reply packet only when the first phase difference reaches the threshold phase difference $\Delta\varphi$ or only when the first phase difference is within the threshold range; the second terminal begins to detect the second phase difference between the waveform phase of the communication carrier signal and the second initial phase when the second terminal completes receiving the data packet to be processed, and sends the reply packet only when the second phase difference reaches the threshold phase difference $\Delta\varphi$ or the second phase difference is within the threshold range. Therefore, simultaneous receiving and sending through detecting the phase difference greatly improves the timekeeping accuracy of the two parties, thus ensuring that the first terminal and the second terminal receive and send reply packets only at a very precise moment. That is, even if the reply packet sent by the second terminal to the first terminal is intercepted by a third party during the transmission, the first terminal has already terminated the communication process when the data tampered by the third party reaches the first terminal, this is because tampering with the data by the third party costs milliseconds, which is far greater than the timekeeping accuracy of the first terminal, and the first terminal immediately stops the communication if not receiving the reply packet at the particular moment. Thus, the risk of data received by the first terminal being altered externally during transmission is prevented and the reliability of the reply packet received by the first terminal is increased. In addition, $\Delta\varphi \geq \omega$ can guarantee that the second terminal completes the processing operation of the data packet to be processed and generates the reply packet before being required to send the reply packet. $\Delta\varphi \leq \lambda$ can make the present communication method and system compatible with the existing communication protocols.

Specific embodiments of the present disclosure will be described in detail with reference to the drawings in the following. The above and other objectives, advantages and features of the present disclosure will become apparent to those skilled in the art.

BRIEF DESCRIPTION OF THE DRAWINGS

Some specific embodiments of the present disclosure will be described in detail in an exemplary but non-restrictive manner with reference to the drawings. The same reference numbers in the drawings identify the same or similar components or parts. Those skilled in the art should understand that the drawings are not necessarily drawn to scale. In the drawings.

DETAILED DESCRIPTION

Embodiment 1

The present embodiment provides a data communication method in which the first terminal keeps generating communication carrier signals during the communication between the first terminal and the second terminal. The communication carrier signal is an electric wave generated by an oscillator and transmitted over a communication channel, which is modulated and used to send data, in communication technique. In this embodiment, the communication carrier signal is generated by the first terminal as a carrier tool tor transmitting data information. In the present embodiment, the first terminal and the second terminal may be any device capable of data interactive communication. Optionally, the first terminal may be a reader, such as a card reader, a computer, a mobile phone, a router, a vehicle-mounted device, a server, etc. The second terminal may be a transponder, such as a smart card, an ID card, an intelligent cipher device, a mobile phone, a computer, a router, a smart home, a wearable device, etc.

Figure 1:
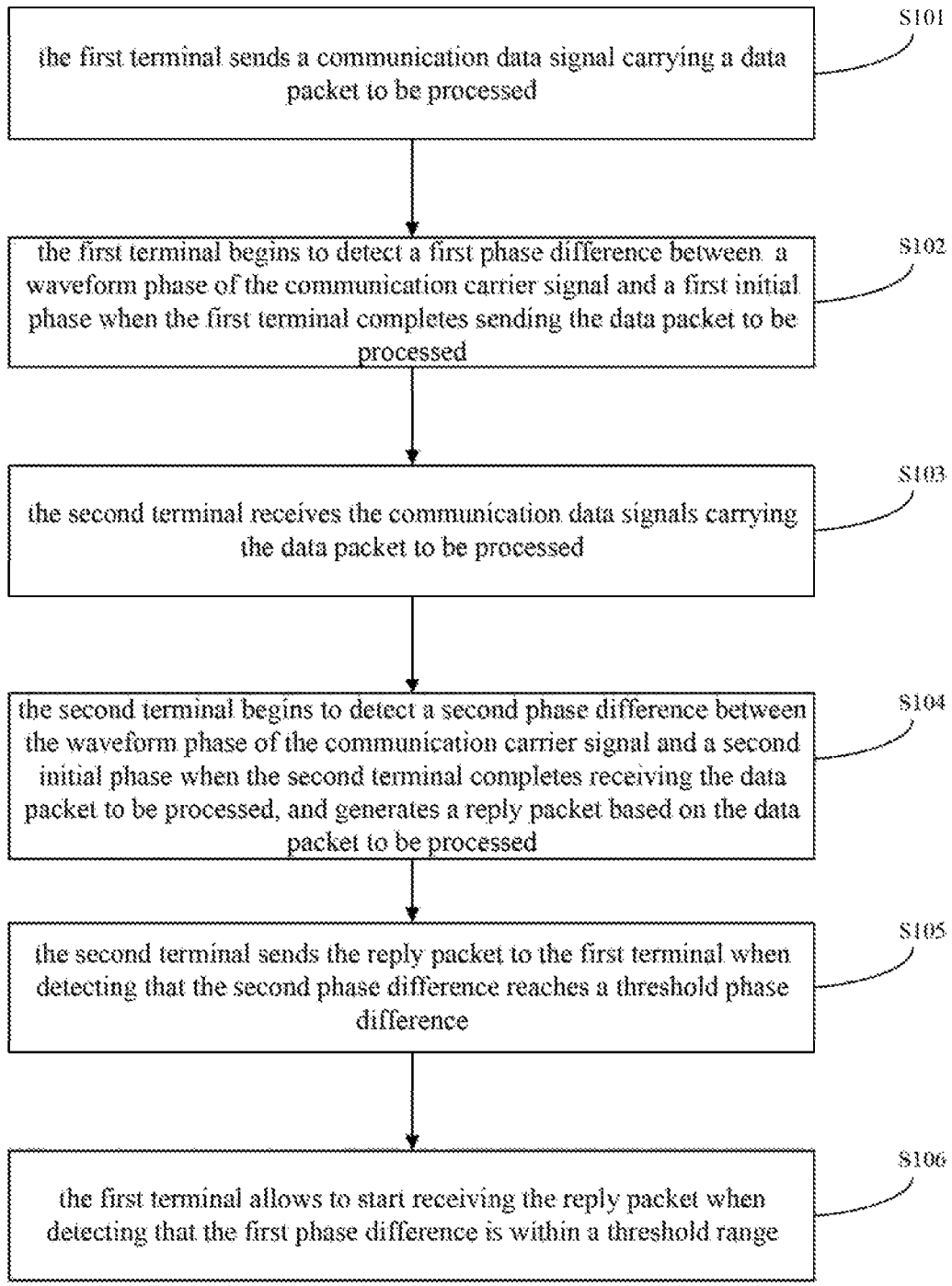
FIG. 1 is a flow chart of a data communication method provided in embodiment 1 of the present disclosure.

As illustrated in FIG. 1, the method includes the following steps.

At S101, the first terminal sends a communication data signal carrying a data packet to be processed.

The communication data signal is obtained by the first terminal by means of modulating the data packet to be processed onto the communication carrier signal. The communication carrier signal is an un-modulated periodic oscillation signal, and the communication carrier signal may be a sine wave or a non-sinusoidal wave (e.g., a periodic pulse sequence). The signal obtained by modulating the data packet to the communication carrier signal is the communication data signal, which contains the full wave characteristic of the data packet to be processed. Generally, the frequency of the communication carrier signal is much higher than the bandwidth of the data packet modulation signal to be processed, otherwise aliasing will occur and the transmission signal will be distorted. The communication data signal transmission allows the first terminal to load the signal of the data packet to be processed onto the communication carrier signal for data transmission, so as to ensure the correct outgoing transmission of the data packet to be processed.

At S102, when the first terminal completes sending the data packet to be processed, the first terminal begins to detect a first phase difference between a waveform phase of the communication carrier signal and a first initial phase, in which the first initial phase difference is the waveform phase of the communication carrier signal when the first terminal completes sending the data packet to be processed.

When the first terminal completes sending the data packet to be processed, the phase value of the current communication carrier signal is set to 0 and this phase value of 0 is used as the first initial phase, and then the phase value of the communication carrier signal is read in real time, thus obtaining the first phase difference between the waveform phase of the communication carrier signal and the first initial phase in real time; or, when the first terminal completes sending the data packet to be processed, the current communication carrier phase is detected by the oscillographic element inside the first terminal and set as the first initial phase, and then the phase difference change of the communication carrier signal is detected in real time, thus obtaining the first phase difference between the waveform phase of the communication carrier signal and the first initial phase in real time. The phase change speed of the communication carrier signal is positively correlated with the frequency of the communication carrier signal. By detecting the difference of the phase of the communication carrier signal with respect to the first initial phase at a certain time T, the time interval between the time T and the time when the first terminal completes sending the data packet to be processed can be accurately recorded based on the phase change difference, for example, if the frequency of the communication carrier signal is v, the duration of one period is 1/v and the phase change of one period is 360°, and then the time required for 1° phase change of the communication carrier signal is 1/360v. Thus, the first terminal can greatly improve the detection accuracy by detecting the time interval on the basis of the phase change of the communication carrier signal.

At S103, the second terminal receives the communication data signal carrying the data packet to be processed.

The second terminal receives the data signal carrying the data packet to be processed according to the frequency of the communication carrier signal, and the amplitude of the meaningful signal wave is different from that of the meaningless signal. Extracting the valid signal, that is, the data signal of the data packet to be processed can obtain the data packet to be processed efficiently.

At S104, when the second terminal completes receiving the data packet to be processed, the second terminal begins to detect a second phase difference between the waveform phase of the communication carrier signal and a second initial phase, and generates a reply packet based on the data packet to be processed, wherein, the second initial phase is the waveform phase of the communication carrier signal when the second terminal completes receiving the data packet to be processed.

When the second terminal completes receiving the data packet to be processed, the phase value of the current communication carrier signal is set to 0 and this phase value of 0 is used as the second initial phase, and then the phase value of the communication carrier signal is read in real time, thus obtaining the second phase difference between the waveform phase of the communication carrier signal and the second initial phase in real time; or, when the second terminal completes receiving the data packet to be processed, the current communication carrier phase is detected by the oscillographic element inside the second terminal, and the current communication carrier phase is set as the second initial phase, and then the phase difference change of the communication carrier signal is detected in real time, thus obtaining the second phase difference between the waveform phase of the communication carrier signal and the second initial phase in real time. The received data packet to be processed is processed to generate the reply packet. The second terminal can time by detecting the communication carrier signal sent by the first terminal, and realize the measurement of the time interval without selling a timer, a crystal oscillator or a power source and the like at the second terminal, thus reducing the production cost of the second terminal. The phase change speed of the communication carrier signal is positively correlated with the frequency of the communication carrier signal. By detecting the change difference between the phase of the communication carrier signal and the second initial phase at a certain time T, the time interval between the time T and the time when the second terminal completes sending the data packet to be processed can be accurately recorded based on the phase change difference, for example, if the frequency of the communication carrier signal is v, the duration of one period is 1/v and the phase change of one period is 360°, and thus the time required for 1° phase change of the communication carrier signal is 1/360 v. Thus, compared to detecting the time interval on the basis of the period change of the communication carrier signal, by detecting the time interval on the basis of the phase change of the communication carrier signal, the second terminal can greatly improve the detection accuracy.

The first terminal and the second terminal perform the time detection based on the phase change of the same communication carrier signal. When the first terminal completes sending the data packet to be processed, the first terminal begins to detect the phase change of the communication carrier signal at time T1, and when the second terminal completes receiving the data packet to be processed, the second terminal begins to detect the phase change of the communication carrier signal at time T2. T2=T1+ΔT1+ΔT2. The first terminal divides the data packet to be processed into x data blocks for transmission, wherein ΔT1 is the transmission time of the xth data block in the data packet to be processed between the first terminal and the second terminal, ΔT2 is the time difference between the time when the xth data block arrives at the second terminal and the time when the second terminal completes receiving the xth data block of the data packet to be processed. The data packet to be processed is transmitted at the light speed during the transmission, and transmission time ΔT1 of the last data block of the data packet to be processed is the ratio of the transmission distance S to the light speed C, that is, $\Delta T1=S/C$, which is a minimum value for $C=3\times10^8$ m/s. Generally, during the process of data packet interaction between both communication panics, the data packet to be transmitted is divided into a plurality of data blocks for transmission. In this embodiment, it is assumed that the data packet to be transmitted is split into x data blocks for transmission, the second terminal has begun to receive the first data block in the data packet to be processed before the first terminal completes sending the last data block (i.e., the xth data block), and at time T1+ΔT1, the second terminal has completed receiving x−1 data blocks in the data packet to be processed. ΔT2 is the time difference between the time when the xth data block arrives at the second terminal and the time when the second terminal completes receiving the xth data block of the data packet to be processed. Thus, ΔT2 is a minimum value. Thus, in the communication method provided in this embodiment, the first terminal and the second terminal may be considered as simultaneously timing based on the communication carrier signal, thus ensuring the synchronization and accuracy of the timing results of both parties.

After the second terminal receives the data packet to be processed, the second terminal performs authentication operation to the data packet to be processed, and after successful authentication, the second terminal extracts key information from the data packet to be processed, processes the key information, and generates a reply packet. For example, in the transaction communication, after the second terminal receives the data packet to be processed, the second terminal performs verification operation on the data packet to be processed to confirm a legal identity of the first terminal, and then extracts and displays the key information, such as the transaction account number and the transaction amount, from the data packet to be processed. After the user confirms the key information, the second terminal signs the key information using a second terminal private key to generate signature data, and generates the reply packet based on the signature data and a second terminal certificate, thus ensuring the security of the communication.

At S105, when detecting that the second phase difference reaches the threshold phase difference Δφ, the second terminal sends the reply packet to the first terminal.

The second terminal detects the change difference between the current phase of the communication carrier signal and the second initial phase in real time. Once the change difference reaches the threshold phase difference Δφ, the generated reply packet is sent to the first terminal. The threshold phase difference Δφ may be stored in the factory setting information of the first terminal and the second terminal. Otherwise, the threshold phase difference Δφ may be generated by means of negotiation between the first terminal and the second terminal, or the threshold phase difference Δφ may be carried in the communication protocol of the first terminal and the second terminal, in which, optionally, $\omega \leq \Delta\varphi \leq \lambda$, ω is a phase variation value of the communication carrier signal generated after the predetermined completion time for the second terminal to process the received data sent by the first terminal. The predetermined completion time is the longest time required by the second terminal to complete processing the data sent by the first terminal. $\omega \leq \Delta\varphi$ can ensure that the second terminal completes the processing operation of the data packet to be processed and generates the reply packet before being required to send the reply packet, and ensure realizing the normal communication between the second terminal and the first terminal. λ is the phase variation value of the communication carrier signal generated after the frame waiting time specified in the communication protocol adopted by the first terminal and the second terminal. The frame waiting time is an effective waiting time after sending the data packet to be processed, which is specified in the communication protocol. The communication fails if no reply packet is received within the frame waiting time. The communication protocol adopted by the first terminal and the second terminal can be a usual communication protocol at present and any possible communication protocol generated in the future, for example, communication protocol ISO14443, and communication protocol ISO15693, $\Delta\varphi \leq \lambda$ can guarantee that the second terminal can send the reply packet to the first terminal within the frame waiting time, which is compatible with the existing communication protocol, and ensures the normal communication between the first terminal and the second terminal under the existing communication protocol. The second terminal detects the phase difference and sends the reply packet once the second phase difference reaches the threshold phase difference Δφ, so that the reply packet is only sent at a specific time point, while the accuracy of the sending time of the reply packet is guaranteed.

At S106, the first terminal is allowed to start receiving the reply packet when detecting that the first phase difference is within a threshold range.

In actual communication process, due to the existence of various communication times, such as data transmission time, data receiving time, data analysis and processing time, and data error correction time of the first terminal and the second terminal, the first terminal may not always be able to receive the reply packet immediately upon the first phase difference reaching Δφ. In fact, in a normal communication state, when the first terminal receives the reply packet sent by the second terminal once the second phase difference reaches the threshold phase difference Δφ, the first phase difference detected by the first terminal is Δφ+i, in which i is the phase variation value of the communication carrier signal generated after various communication times, such as data transmission time, the data receiving time, the data analysis and processing time, the data error correction time. Therefore, the first terminal cannot receive the reply packet immediately upon detecting that the first phase difference reaches Δφ, instead, receives the reply packet within a very small time range after detecting that the first phase difference reaches the threshold phase difference Δφ. A threshold range may be obtained based on the threshold phase difference Δφ according to an error algorithm. Within the threshold range, only maximum communication time can be realized between the first terminal and the second terminal, for example, the maximum data transmission time, the maximum data receiving time, the maximum data analysis and processing time, and the maximum data error correction time. In actual communication process, the actual values of the maximum communication time between the first terminal and the second terminal, such as the maximum data transmission time, the maximum data receiving time, the maximum data analysis and processing time, and the maximum data error correction time, are minimum values, and thus the threshold range obtained by the error algorithm is a small phase difference range.

For example, optionally the threshold range is [Δφ, Δφ+2θ]. The first terminal refuses to receive data until the first phase difference reaches $\Delta\varphi$, and when the first phase difference reaches $\Delta\varphi$, the first terminal is allowed to begin to receive the reply packet. Once the first terminal detects that the first phase difference reaches $\Delta\varphi+2\theta$, the first terminal begins to refuse the reception of the reply packet. Due to the existence of a certain communication distance S between the first terminal and the second terminal, the communication carrier signal will produce a certain amount of phase change $\varepsilon$ after passing the communication distance S, and the first terminal may not be able to receive the reply packet immediately upon detecting that the first phase difference reaches $\Delta\varphi$. In fact, in a normal communication state, when the first terminal receives the reply packet sent from the second terminal once detecting that the second phase difference reaches the threshold phase difference $\Delta\varphi$, the first phase difference detected by the first terminal is $\Delta\varphi+2\varepsilon$. Since the actual communication distance S between the first terminal and the second terminal is necessarily smaller than the maximum communication distance supported by the communication mode adopted by the first terminal and the second terminal, and optionally, the communication mode adopted by the first terminal and the second terminal includes a short-range wireless communication mode, and $\theta$ is the phase variation value of the communication carrier signal generated over the maximum communication distance supported by the communication mode adopted by the first terminal and the second terminal, then $\varepsilon$ is necessarily less than $\theta$. That is, in a normal communication state, once the first terminal detects that the first phase difference is within the range [$\Delta\varphi$, $\Delta\varphi+2\theta$], the first terminal is necessarily able to receive the reply packet, and once the first phase difference detected by the first terminal exceeds $\Delta\varphi+2\theta$ and the first terminal does not receive the reply packet, it can be determined that abnormality occurs in the reply packet transmission, and the reception of the reply packet may be rejected, thereby ensuring the security of the communication. Optionally, $\Delta\varphi+2\theta$ is less than or equal to $\lambda$, in which $\lambda$ is the phase variation value of the communication carrier signal generated after the frame waiting time specified in the communication protocol adopted by the first terminal and the second terminal. $\Delta\varphi+2\theta$ being less than or equal to $\lambda$ can ensure that the first terminal sends the reply packet to the second terminal within the frame waiting time, which is compatible with existing communication protocols to ensure normal communication between the first terminal and the second terminal under the existing communication protocol. When $\Delta\varphi+2\theta$ is less than or equal to $\lambda$, $\Delta\varphi$ is also necessarily smaller than $\lambda$, thus ensuring that the second terminal sends the reply packet to the first terminal within the frame waiting time, which is compatible with existing communication protocols and ensures the normal communication between the first terminal and the second terminal under the existing communication protocol.

For example, when the distance between the first terminal and the second terminal is less than 10 cm, the time required to propagate the data signal is negligible since the data signal is propagated at light speed, that is, when the first terminal receives the reply packet sent by the second terminal once detecting that the second phase difference reaches the threshold phase difference $\Delta\varphi$, the first phase difference detected by the first terminal is also $\Delta\varphi$, and in this case, since $\Delta\varphi$ is within the range [$\Delta\varphi$, $\Delta\varphi+2\theta$], the first terminal is allowed to begin to receive the data until the reception is completed, and to process the received data. In the present embodiment, when the distance between the first terminal and the second terminal is very small, normal communication can be guaranteed. When the distance between the first terminal and the second terminal is the maximum communication distance supported by the communication mode, for example, the communication distance of 10 meters supported by Bluetooth 2.0, and the communication distance of 400 meters supported by Zigbee is, the phase variation value of the communication carrier signal generated over the space area between the first terminal and the second terminal is $\theta$. That is, when the first terminal receives the reply packet sent by the second terminal once detecting that the second phase difference reaches the threshold phase difference $\Delta\varphi$, the first phase difference detected by the first terminal is $\Delta\varphi+2\theta$, and in this case, since $\Delta\varphi+2\theta$ is within the range [$\Delta\varphi$, $\Delta\varphi+2\theta$], the first terminal is allowed to start receiving until the reception is completed, and to process the received data. In the present embodiment, normal communication can also be ensured even if the distance between the first terminal and the second terminal is the maximum distance supported by the communication mode. When the distance between the first terminal and the second terminal is within the maximum communication distance supported by the communication mode, the phase variation value of the communication carrier signal generated after passing through the space area between the first terminal and the second terminal is $\varepsilon$, and $\varepsilon$ is less than $\theta$. When the first terminal receives the reply packet sent by the second terminal once detecting that the second phase difference reaches the threshold phase difference $\Delta\varphi$, the first phase difference detected by the first terminal is $\Delta\varphi+2\varepsilon$, and in this case, since $\Delta\varphi+2\varepsilon$ is within the range [$\Delta\varphi$, $\Delta\varphi+2\theta$], the first terminal is allowed to receive data until the reception is completed, and to process the received data. As can be seen in the present embodiment, normal communication can also be ensured even if the distance between the first terminal and the second terminal is the maximum distance supported by the communication mode. Other than the above case, the first terminal does not allow the reception of data information sent from external. That is, the first terminal is only allowed to receive the reply packet when the detected first phase difference is within the range [$\Delta\varphi$, $\Delta\varphi+2\theta$], thus greatly improving the reliability of the received reply packet. During data communication, the first terminal and the second terminal receive and send data simultaneously by detecting the phase difference, which greatly enhances the timekeeping accuracy of the two parties, thereby ensuring that the first terminal and the second terminal receive and send the reply packet only at very precise moment. Even if the reply packet sent by the second terminal to the first terminal is intercepted by a third party during the transmission, the first terminal has already terminated the communication when the data tampered by the third party reaches the first terminal this is because tampering with the data by the third party costs milliseconds, which is far greater than the timekeeping precision of the first terminal, and the first terminal immediately stops the communication if not receiving the reply packet at the particular time. Therefore, the risk of data received by the first terminal being altered externally during transmission is prevented and the reliability of the reply packet received by the first terminal is increased.

Figure 2:
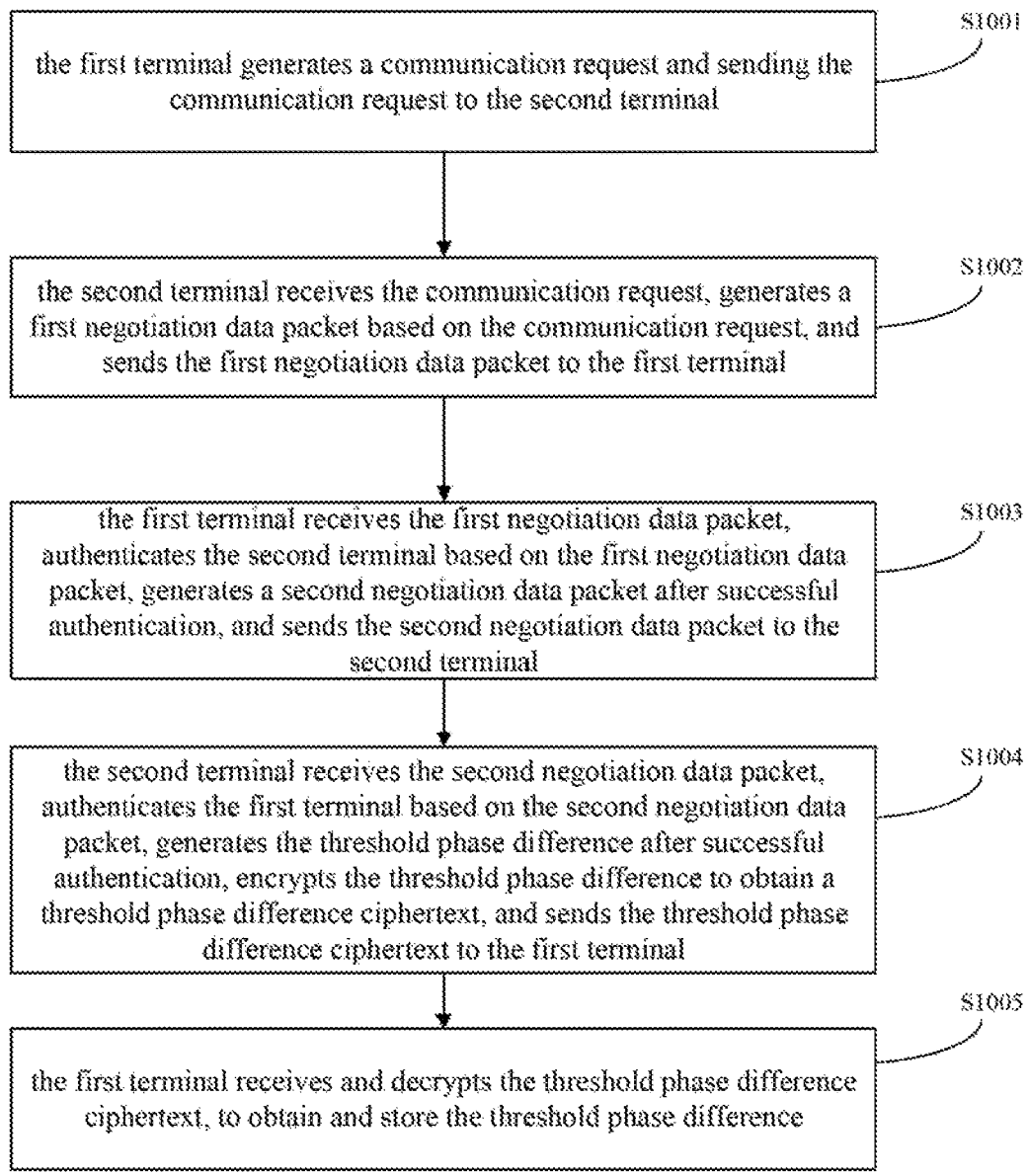
FIG. 2 is a flow chart of a threshold phase difference negotiation method provided in embodiment 1 of the present disclosure.

Optionally, as illustrated in FIG. 2, in Step S101, before the first terminal sends the communication data signal carrying the data packet to be processed, following steps are performed.

At S1001, a communication request is generated by the first terminal and sent to the second terminal.

At S1002, the second terminal receives the communication request and generates a first negotiation data packet based on the communication request, and sends the first negotiation data packet to the first terminal.

At S1003, the first terminal receives the first negotiation data packet and authenticates the second terminal based on the first negotiation data packet, and after successful authentication, generates a second negotiation data packet and sends the second negotiation data packet to the second terminal.

At S1004, the second terminal receives the second negotiation data packet and authenticates the first terminal based on the second negotiation data packet, and after successful authentication, the second terminal generates and encrypts the threshold phase difference $\Delta\varphi$ to further obtain the threshold phase difference ciphertext, and sends the threshold phase difference ciphertext to the first terminal, wherein $\Delta\varphi \leq \lambda$, $\lambda$ is the phase variation value of the communication carrier signal generated after the frame waiting time specified in the communication protocol adopted by the first terminal and the second terminal.

The frame waiting time refers to the effective waiting time after sending the data packet to be processed described in the communication protocol. It is determined that the communication fails when the waiting time exceeds the frame waiting time. $\Delta\varphi \leq \lambda$ can guarantee that the second terminal sends the reply packet to the first terminal within the frame waiting time, which is compatible with the existing communication protocol, and ensures the normal communication between the first terminal and the second terminal under the existing communication protocol.

Optionally, $\omega \leq \Delta\varphi \leq \lambda$, in which $\omega$ is the phase variation value of the communication carrier signal generated after the predetermined completion time for the second terminal to process the received data sent by the first terminal. $\omega$ can be obtained in various ways, including but not limited to the following ways: $\omega$ can be obtained by the first terminal through an external key input, $\omega$ can be obtained by the first terminal through an transmission from the second terminal, $\omega$ can be obtained by the first terminal through code scanning, or $\omega$ can be obtained by the first terminal based on the preset factory information. $\omega \leq \Delta\varphi$ ensures that the second terminal completes the processing operation of the data packet to be processed and generates the reply packet before the second terminal is required to send the reply packet, which ensures normal communication between the second terminal and the first terminal.

At S1005, the first terminal receives and decrypts the threshold phase difference ciphertext, obtains and stores the threshold phase difference $\Delta\varphi$.

Steps S1001 to S1005 may include, but are not limited to the following three solutions provided in this embodiment.

Solution 1:

The first terminal generates a first random number and sends the first random number to the second terminal.

The first random number may be generated by the first terminal based on an external random noise signal, or may be generated by an internal random number generator, which ensures the external inaccessibility of the first random number.

The second terminal receives the first random number, generates a second random number, signs the first random number using a second device private key to generate first signature information, and sends the first negotiation data packet to the first terminal. The first negotiation data packet includes at least a CA certificate of the second terminal, the first signature information, and the second random number.

The second random number may be generated by the second terminal based on an external random noise signal or may be generated based on an internal random number generator, which ensures the external inaccessibility of the second random number. The second device signs the first random number based on its own private key, and sends its CA certificate to the first terminal, such that the first terminal authenticate the legality of the second terminal.

The first terminal receives the first negotiation data and authenticates the CA certificate of the second terminal. After successful authentication, the first terminal obtains the second terminal public key, performs verification operation on the first signature information based on the second terminal public key. After successful verification, the first terminal signs the second random number using the first device private key to generate second signature information, and sends the second negotiation data packet to the second terminal, wherein the second negotiation data packet includes at least a CA certificate of the first terminal and the second signature information.

The first terminal authenticates the identity of the second terminal based on the second terminal public key to ensure the legality of the second terminal. After successful authentication, the first device signs the second random number based on its own private key, and sends its own CA certificate to the second terminal, such that the second terminal can authenticate the legality of the first terminal.

The second terminal receives the second negotiation data and authenticates the CA certificate of the first terminal. After successful authentication, the second terminal obtains the first terminal public key, and performs verification operation on the second signature information based on the first terminal public key. After successful verification, the second terminal generates the threshold phase difference $\Delta\varphi$, and encrypts the threshold phase difference $\Delta\varphi$ using the first terminal public key to obtain the threshold phase difference ciphertext, and sends the threshold phase difference ciphertext the first terminal.

The second terminal authenticates the identity of the first terminal based on the first terminal public key to ensure the legality of the first terminal. After successful authentication, the second terminal generates the threshold phase difference $\Delta\varphi$ and encrypts the threshold phase difference $\Delta\varphi$ using the first terminal public key to obtain the threshold phase difference ciphertext. The threshold phase difference ciphertext can only be decrypted by the first terminal private key since the threshold phase difference is encrypted by the first terminal public key. Moreover, the first terminal private key is stored inside the first terminal security chip and cannot be obtained externally, thus ensuring the security of the threshold phase difference $\Delta\varphi$.

The first terminal receives the threshold phase difference ciphertext, and decrypts the threshold phase difference ciphertext using the first terminal private key, to obtain and store the threshold phase difference $\Delta\varphi$.

The first terminal decrypts the threshold phase difference ciphertext using its own private key, and obtains and stores the threshold phase difference $\Delta\varphi$, realizing the threshold phase difference negotiation between the first terminal and the second terminal, while ensuring the security of the negotiation.

Solution 2:

The first terminal generates the first random number and sends the first random number and the CA certificate of the first terminal to the second terminal.

The first random number may be generated by the first terminal based on an external random noise signal or may be generated based on an internal random number generator, which ensures the external inaccessibility of the first random number.

The second terminal receives the first random number and the CA certificate of the first terminal, generates a second random number, authenticates the CA certificate of the first terminal, and successful authentication, obtains the first terminal public key, signs the first random number using the second terminal private key to generate the first signature information, encrypts the second random number using the first terminal public key to generate the second random number ciphertext, and sends the first negotiation information the first terminal, wherein, the first negotiation information includes at least the CA certificate of the second terminal, the first signature information and the second random number ciphertext.

The second random number may be generated by the second terminal based on an external random noise signal or may be generated based on an internal random number generator, which ensures the external inaccessibility of the second random number. The second terminal obtains the first terminal public key based on the CA certificate of the first terminal and encrypts the second random number using the first terminal public key. The second random number ciphertext generated using the first terminal public key encryption can only be decrypted with the first terminal private key, and the first terminal private key is stored inside the first terminal security chip, and cannot be obtain externally, thus ensuring the security of the second random number.

The first terminal receives the first negotiation data and authenticates the CA certificate of the second terminal. After successful authentication, the first terminal performs verification operation on the first signature information based on the second terminal public key. After successful verification, the first terminal decrypts the second random number ciphertext using the first device private key to obtain the second random number, and signs the second random number using the first device private key to generate the second signature information. The first terminal generates a third random number and encrypts the number using the second device public key to obtain the third random number ciphertext, obtains the transmission private key based on the second random number and the third random number and according to the first preset algorithm, and sends the second negotiation information to the second terminal, in which the second negotiation information includes at least the second signature information and the third random number ciphertext.

The first terminal authenticates the identity of the second terminal based on the second terminal public key to ensure the legality of the second terminal. After successful authentication, the first terminal decrypts the second random number ciphertext using its own private key to obtain the second random number, and generates the third random number. The first terminal obtains the transmission private key based on the second random number and the third random number and according to the first preset algorithm. The third random number may be generated by the first terminal based on an external random noise signal or may be generated based on an internal random number generator, which ensures it is difficult to access the third random number externally. The first terminal encrypts the third random number using the second terminal public key. Since the third random number ciphertext generated using the second terminal public key encryption can only be decrypted with the second terminal private key, and the second terminal private key is stored inside the second terminal security chip and cannot be obtained externally, the security of the third random number can be guaranteed.

The second terminal receives the second negotiation data, and performs verification operation on the second signature information based on the first terminal public key, and after successful verification, decrypts the third random number ciphertext using the second terminal private key to obtain the third random number, and obtains the transmission private key based on the second random number and the third random number and according to the first preset algorithm. The second terminal generates the transmission private key generation feedback information and sends the transmission private key generation feedback information to the first terminal.

The second terminal decrypts the third random number ciphertext using its own private key to obtain the third random number, and obtains the transmission private key based on the second random number and the third random number and according to the first preset algorithm. Since both the first terminal and the second terminal obtain the transmission private key based on the second random number and the third random number and according to the first preset algorithm, it guarantees that both sides can obtain the same transmission private key through negotiation without sending out the transmission private key, thus preventing the leakage of the transmission private key in the communication process, and improving the security of the communication.

The first terminal receives the transmission private key generation feedback information, generates the threshold phase difference $\Delta\varphi$, and encrypts the threshold phase difference $\Delta\varphi$ using the transmission private key to generate the threshold phase difference ciphertext, and sends the threshold phase difference ciphertext to the second terminal.

The first terminal generates the threshold phase difference $\Delta\varphi$ and encrypts the threshold phase difference $\Delta\varphi$ using the transmission private key to generate the threshold phase difference ciphertext. The transmission private key is obtained by the both first terminal and the second terminal based on the second random number and the third random number and according to the first default algorithm, and is stored only inside the first terminal and the second terminal, and cannot be obtained externally, thus ensuring the security of threshold phase difference $\Delta\varphi$.

The second terminal receives the threshold phase difference ciphertext, decrypts the threshold phase difference ciphertext using the transmission private key to obtain the threshold phase difference $\Delta\varphi$, and stores the threshold phase difference $\Delta\varphi$.

The second terminal decrypts the threshold phase difference ciphertext using the transmission private key, and obtains and stores the threshold phase difference $\Delta\varphi$, realizing the threshold phase difference $\Delta\varphi$ negotiation between the first terminal and the second terminal, and ensuring the security of the negotiation process at the same time.

Solution 3:

The first terminal generates the first random number and sends the first random number and the CA certificate of the first terminal to the second terminal.

The first random number may be generated by the first terminal based on an external random noise signal or may be generated based on an internal random number generator, which ensures the external inaccessibility of the first random number.

The second terminal receives the first random number and the CA certificate of the first terminal, generates the second random number, authenticates the CA certificate of the first terminal, and after successful authentication, obtains the first terminal public key, signs the first random number using the second terminal private key to generate the first signature information, encrypts the second random number using the first terminal public key to generate the second random number ciphertext, and sends the first negotiation information to the first terminal, in which the first negotiation information includes at least the CA certificate of the second terminal, the first signature information and the second random number ciphertext.

The second random number may be generated by the second terminal based on an external random noise signal or may be generated based on an internal random number generator to ensure the external inaccessibility of the second random number. The second terminal obtains the first terminal public key based on the CA certificate of the first terminal and encrypts the second random number using the first terminal public key. The second random number ciphertext generated using the first terminal public key encryption can only be decrypted with the first terminal private key, and the first terminal private key is stored inside the first terminal security chip and cannot be obtained externally, thus ensuring the security of the second random number.

The first terminal receives the first negotiation data and authenticates the CA certificate of the second terminal. After successful authentication, the first terminal performs verification operation on the first signature information based on the second terminal public key. After successful verification, the first terminal decrypts the second random number ciphertext using the first device private key to obtain the second random number, and signs the second random number using the first device private key to generate the second signature information. The first terminal generates the third random number and encrypts the third random number using the second device public key to obtain the third random number ciphertext, obtains the transmission private key based on the second random number and the third random number and according to the first preset algorithm, and sends the second negotiation information to the second terminal, in which the second negotiation information includes at least the second signature information and the third random number ciphertext.

The first terminal authenticates the identity of the second terminal based on the second terminal public key to ensure the legality of the second terminal. After successful authentication, the first terminal decrypts the second random number ciphertext using its own private key to obtain the second random number, generates the third random number, and obtains the transmission private key based on the second random number and the third random number and according to the first preset algorithm. The third random number may be generated by the first terminal based on an external random noise signal or may be generated based on an internal random number generator, which ensures the external inaccessibility of the third random number. The third random number is encrypted using the second terminal public key. Since the third random number ciphertext generated using the second terminal public key encryption can only be decrypted with the second terminal private key, and the second terminal private key is stored inside the second terminal security chip and cannot be obtained externally, the security of threshold phase difference $\Delta\varphi$ is ensured.

The second terminal receives the second negotiation data, and performs verification operation on the second signature information based on the first terminal public key, and after successful verification, decrypts the third random number ciphertext using the second terminal private key to obtain the third random number, and obtains the transmission private key based on the second random number and the third random number and according to the first preset algorithm. The second terminal generates the threshold phase difference $\Delta\varphi$, encrypts the threshold phase difference using the transmission private key to generate the threshold phase difference ciphertext, and sends the threshold phase difference ciphertext to the first terminal.

The second terminal decrypts the third random number ciphertext using its own private key to obtain the third random number, and obtains the transmission private key based on the second random number and the third random number and according to the first preset algorithm. Since both the first terminal and the second terminal obtain the transmission private key based on the second random number and the third random number and according to the first preset algorithm, both sides obtain the same transmission private key through negotiation without sending out the transmission private key, preventing the leakage of the transmission private key during the communication, and improving the security of the communication. The second terminal generates the threshold phase difference and encrypts the threshold phase difference $\Delta\varphi$ using the transmission private key to generate the threshold phase difference ciphertext. The transmission private key is obtained by both the first terminal and the second terminal based on the second random number and the third random number and according to the first preset algorithm, and the transmission private key exists only inside the first terminal and the second terminal, and cannot obtained externally, thus ensuring the security of threshold phase difference$\Delta\varphi$.

The first terminal receives the threshold phase difference ciphertext, decrypts the threshold phase difference ciphertext using the transmission private key, and obtains and stores the threshold phase difference $\Delta\varphi$.

The first terminal decrypts the threshold phase difference ciphertext using the transmission private key, and obtains and stores the threshold phase difference $\Delta\varphi$, realizing the threshold phase difference negotiation between the first terminal and the second terminal, while ensuring the security of the negotiation process.

With the negotiation of the threshold phase difference $\Delta\varphi$, the security of the threshold phase difference $\Delta\varphi$ can be guaranteed and the risk of the threshold phase difference $\Delta\varphi$ being obtained by the outside is prevented. Further, the negotiation process of the threshold phase difference $\Delta\varphi$ can be repealed before each information exchange, thus further ensuring the security of the threshold phase difference $\Delta\varphi$.

Optionally, the threshold phase difference $\Delta\varphi$ is stored in the preset factory information of the first terminal and the second terminal, wherein $\Delta\varphi \leq \lambda$.

By storing the threshold phase difference $\Delta\varphi$ in the preset factory information of the first terminal and the second terminal, there is no need to transmit the threshold phase difference $\Delta\varphi$ between the first terminal and the second terminal, thus avoiding the external interception of the threshold phase difference $\Delta\varphi$ during the transmission, and ensuring the security of the threshold phase difference $\Delta\varphi$. $\lambda$ is the phase variation value of the communication carrier signal generated within the frame waiting time specified in the communication protocol adopted by the first terminal and the second terminal. The frame waiting time is an effective waiting time after sending the data packets to be processed, which is specified in the communication protocol. The communication fails if the waiting time is beyond the frame waiting time. $\Delta\varphi \leq \lambda$ can guarantee that the second terminal sends the reply packet to the first terminal within the frame waiting time, which is compatible with the existing communication protocol, and ensures the normal communication between the first terminal and the second terminal under the existing communication protocol.

Optionally, the first terminal interacts with the second terminal based on a phase communication protocol. The phase communication protocol is a communication protocol in which the transmission data includes at least the threshold phase difference $\Delta\varphi$, or, the phase communication protocol is a communication protocol in which the transmission data includes at least the threshold phase difference $\Delta\varphi$ and the tamper-resistance check value, in which the tamper-resistant check value is used for checking threshold phase difference $\Delta\varphi$.

The communication protocol adopted by the first terminal and the second terminal may specify that the threshold phase difference $\Delta\varphi$ is carried in the communication data. The first terminal and the second terminal read the threshold phase difference $\Delta\varphi$ in the data packet after receiving the data packet during the communication process and time the communication based on the threshold phase difference $\Delta\varphi$ in the data packet. Further, the communication protocol adopted by the first terminal and the second terminal may also specify that both the threshold phase difference $\Delta\varphi$ and the tamper-resistant check value are carried simultaneously in the communication data, and the first terminal and the second terminal read the threshold phase difference $\Delta\varphi$ and the tamper-resistant check value after receiving the data packet during the communication process. The tamper-resistant check value is a check value generated based on the threshold phase difference $\Delta\varphi$. For example, the tamper-resistant check value is obtained through digest operation of the threshold phase difference. The first terminal and the second terminal read the threshold phase difference $\Delta\varphi$ in the data packet and perform the check operation after receiving the data packet during the communication process. Once the first terminal and the second terminal finds after receiving the data packet that the threshold phase difference $\Delta\varphi$ in the data packet is tampered by others, it will result in the check failure. After successful check, the timing communication between the first terminal and the second terminal is performed based on the threshold phase difference $\Delta\varphi$ in the data packet. Optionally, the threshold phase difference $\Delta\varphi$ and the tamper-resistant check value can be attached to the data header or data tail of the communication data packet specified in the existing communication protocol. Of course, the present disclosure is not limited to this. It is guaranteed that each data packet contains the threshold phase difference $\Delta\varphi$ information by writing the threshold phase difference $\Delta\varphi$ into the transmission protocol, and the first terminal and the second terminal do not need to store the threshold phase difference $\Delta\varphi$, which prevents the third pony from breaking the storage module of the first terminal or the second terminal to obtain the threshold phase difference $\Delta\varphi$ and also improves the communication efficiency.

Optionally, the threshold phase difference $\Delta\varphi$ is generated by the first terminal based on $\omega$, and $\omega \leq \Delta\varphi$, wherein, $\omega$ is a phase variation value of the communication carrier signal generated over the predetermined completion time for the second terminal to process the received data sent by the first terminal.

$\omega$ can be obtained in various ways, including but not limited to the following ways: $\omega$ can be obtained by the first terminal through an external key input, $\omega$ can be obtained by the transmission from the second terminal to the first terminal. $\omega$ can be obtained by the first terminal through code scanning, or $\omega$ can be obtained by the first terminal based on the preset factory information. $\omega \leq \Delta\varphi$ ensures that the second terminal completes the processing operation of the data packet to be processed and generates the reply packet before the second terminal is required to send the reply packet, and ensures the realization of the normal communication between the second terminal and the first terminal.

Optionally, $\omega \leq \Delta\varphi \leq \lambda$, in which $\lambda$ is the phase variation value of the communication carrier signal generated over the frame waiting time specified in the communication protocol adopted by the first terminal and the second terminal. The frame waiting time is an effective waiting time after sending the data packet to be processed, which is specified in the communication protocol. The communication fails if the waiting time is beyond the frame waiting time. $\Delta\varphi \leq \lambda$ can guarantee that the second terminal sends the reply packet to the first terminal within the frame waiting time, which is compatible with the existing communication protocol, and ensures normal communication between the first terminal and the second terminal under the existing communication protocol.

After the first terminal generates the threshold phase difference $\Delta\varphi$, the threshold phase difference $\Delta\varphi$ may be sent to the second terminal in any of following manners.

The first terminal encrypts the threshold phase difference $\Delta\varphi$ using the second terminal public key to generate the threshold phase difference ciphertext, and sends the threshold phase difference ciphertext to the second terminal. The threshold phase difference ciphertext generated by encrypting the threshold phase difference using the second terminal public key can only be decrypted with the second terminal private key, and the second terminal private key is stored inside the second terminal security chip, and cannot be obtained externally, thus ensuring the security of the threshold phase difference $\Delta\varphi$. The second terminal receives the threshold phase difference ciphertext, decrypts the threshold phase difference ciphertext with the second terminal private key, and obtains and stores the threshold phase difference $\Delta\varphi$, realizing the transmission of the generated threshold phase difference $\Delta\varphi$ from the first terminal to the second terminal, while ensuring the security of the transmission of the threshold phase difference $\Delta\varphi$. Or, the threshold phase difference $\Delta\varphi$ is sent to the second terminal in the following manner.

The first terminal generates the first random number and sends the first random number and the CA certificate of the first terminal to the second terminal.

The first random number may be generated by the first terminal based on an external random noise signal or may be generated based on an internal random number generator, which ensures the external inaccessibility of the first random number.

The second terminal receives the first random number and the CA certificate of the first terminal, generates the second random number, authenticates the CA certificate of the first terminal, and after successful authentication, obtains the first terminal public key, signs the first random number using the second terminal private key to generate the first signature information, encrypts the second random number using the first terminal public key to obtain the second random number ciphertext, and sends the first negotiation information to the first terminal, in which the first negotiation information includes at least the CA certificate of the second terminal, the first signature information and the second random number ciphertext.

The second random number may be generated by the second terminal based on an external random noise signal or may be generated based on an internal random number generator, which ensures the external inaccessibility of the second random number. The second terminal obtains the first terminal public key based on the CA certificate of the first terminal and encrypts the second random number using the first terminal public key. The second random number ciphertext generated using the first terminal public key encryption can only be decrypted with the first terminal private key, and the first terminal private key is stored inside the first terminal security chip and cannot be obtained externally, thus ensuring the security of the second random number.

The first terminal receives the first negotiation data and authenticates the CA certificate of the second terminal. After successful authentication, the first signature information is verified based on the second terminal public key. After successful verification, the second random number ciphertext is decrypted using the first device private key to obtain the second random number, and the second random number is signed using the first device private key to generate the second signature information, and the first terminal generates the third random number and encrypts the third random number using the second device public key to obtain the third random number ciphertext. Based on the second random number and the third random number and according to the first preset algorithm, the transmission private key is obtained, and the second negotiation information is sent to the second terminal, in which the second negotiation information includes at least the second signature information and the third random number ciphertext.

The first terminal authenticates the identity of the second terminal based on the second terminal public key to ensure the legality of the second terminal. After successful authentication, the first terminal decrypts the second random number ciphertext using its own private key to obtain the second random number and generates the third random number. The transmission private key is obtained based on the second random number and the third random number and according to the first preset algorithm. The third random number may be generated by the first terminal based on an external random noise signal or may be generated based on an internal random number generator, which ensures the external inaccessibility of the third random number. The third random number is encrypted using the second terminal public key. Since the third random number ciphertext generated by encrypting the third random number using the second terminal public key can only be decrypted with the second terminal private key, and the second terminal private key is stored inside the second terminal security chip and cannot be obtained externally, the security of the third random number is guaranteed.

The second terminal receives the second negotiation data, and performs verification operation on the second signature information based on the first terminal public key, and after successful verification, decrypts the third random number ciphertext using the second terminal private key to obtain the third random number, and obtains the transmission private key based on the second random number and the third random number according to the first preset algorithm. The second terminal generates the transmission private key generation feedback information and sends the transmission private key generation feedback information to the first terminal.

The second terminal decrypts the third random number ciphertext using its own private key to obtain the third random number, and obtains the transmission private key based on the second random number and the third random number according to the first preset algorithm. Since both the first terminal and the second terminal obtain the transmission private key based on the second random number and the third random number according to the first preset algorithm, both sides obtain the same transmission private key through negotiation without sending out the transmission private key, which avoids the leakage of the transmission private key in the communication process, and improves the security of the communication.

The first terminal receives the transmission private key generation feedback information, encrypts the generated threshold phase difference $\Delta\varphi$ using the transmission private key to generate the threshold phase difference ciphertext, and sends the threshold phase difference ciphertext to the second terminal.

The first terminal encrypts the threshold phase difference $\Delta\varphi$ using the transmission private key to generate the threshold phase difference ciphertext. The transmission private key is obtained by both the first terminal and the second terminal based on the second random number and the third random number according to the first default algorithm, and the transmission private key exists only inside the first terminal and the second terminal and cannot be obtained externally, thus ensuring the security of threshold phase difference $\Delta\varphi$.

The second terminal receives the threshold phase difference ciphertext, decrypts the threshold phase difference ciphertext using the transmission private key, and obtains and stores the threshold phase difference $\Delta\varphi$.

The second terminal decrypts the threshold phase difference ciphertext using the transmission private key, and obtains and stores the threshold phase difference $\Delta\varphi$, realizing sending the threshold phase difference from the first terminal to the second terminal, while ensuring the security of the sending process of the threshold phase difference $\Delta\varphi$.

Optionally, the threshold phase difference $\Delta\varphi$ is generated by negotiation between the first terminal and the second terminal, wherein, the negotiation process includes: the first terminal generating $\Delta\varphi$ and sending $\Delta\varphi$ to the second terminal, and the second terminal sending a response message to the first terminal after successful authentication to the first terminal; or, the second terminal generating $\Delta\varphi$ and sending $\Delta\varphi$ to the first terminal, and the first terminal sending a response message to the second terminal after successful authentication to the second terminal; or, the first terminal generating $\Delta\varphi 1$ and sending $\Delta\varphi 1$ to the second terminal, the second terminal generating $\Delta\varphi 2$ and sending $\Delta\varphi 2$ to the first terminal, and both the first terminal and the second terminal generating $\Delta\varphi$ using $\Delta\varphi 1$ and $\Delta\varphi 2$ based on the same algorithm.

The negotiation process described above may include, but is not limited to, the following three solutions provided by this embodiment.

Solution 1:

The first terminal generates the first random number and sends the first random number to the second terminal.

The first random number may be generated by the first terminal based on an external random noise signal or may be generated based on an internal random number generator, which ensures the external inaccessibility of the first random number.

The second terminal receives the first random number, generates the second random number, signs the first random number using the second device private key to generate the first signature information, and sends the first negotiation data packet to the first terminal, in which the first negotiation data packet includes at least the CA certificate of the second terminal, the first signature information and the second random number.

The second random number may be generated by the second terminal based on an external random noise signal or may be generated based on an internal random number generator, which ensures the external inaccessibility of the second random number. The second device signs the first random number based on its own private key, and sends its own CA certificate to the first terminal, so that the first terminal can authenticate the legality of the second terminal.

The first terminal receives the first negotiation data and authenticates the CA certificate of the second terminal. After successful authentication, the first terminal obtains the second terminal public key, and performs verification operation on the first signature information based on the second terminal public key. After successful verification, the first terminal signs the second random number using the first device private key to generate the second signature information, and sends the second negotiation data packet to the second terminal, wherein, the second negotiation data packet includes at least the CA certificate of the first terminal and the second signature information.

The first terminal authenticates the identity of the second terminal based on the second terminal public key to ensure the legality of the second terminal. After successful authentication, the first device signs the second random number based on its own private key, and sends its own CA certificate to the second terminal, so that the second terminal can authenticate the legality of the first terminal.

The second terminal receives the second negotiation data and authenticates the CA certificate of the first terminal. After successful authentication, the first terminal public key is obtained, and the second signature information is verified based on the first terminal public key. After successful verification, the threshold phase difference $\Delta\varphi$ is generated and encrypted using the first terminal public key to generate the threshold phase difference ciphertext, and the threshold phase difference ciphertext is sent to the first terminal.

The second terminal authenticates the identity of the first terminal based on the first terminal public key to ensure the legality of the first terminal. After successful authentication, the second terminal generates the threshold phase difference $\Delta\varphi$ and encrypts the threshold phase difference using the first terminal public key to obtain the threshold phase difference ciphertext. The threshold phase difference ciphertext generated by encrypting the threshold phase difference using the first terminal public key can only be decrypted with the first terminal private key, and the first terminal private key is stored inside the first terminal security chip and cannot be obtained externally, thus ensuring the security of the threshold phase difference $\Delta\varphi$.

The first terminal receives the threshold phase difference ciphertext, decrypts the threshold phase difference ciphertext using the first terminal private key, and obtains and stores the threshold phase difference $\Delta\varphi$.

The first terminal decrypts the threshold phase difference ciphertext using its own private key, and obtains and stores the threshold phase difference realizing the threshold phase difference negotiation between the first terminal and the second terminal, while ensuring the security of the negotiation process.

Solution 2:

The first terminal generates the first random number and sends the first random number and the CA certificate of the first terminal to the second terminal.

The first random number may be generated by the first terminal based on an external random noise signal or may be generated based on an internal random number generator, which ensures the external inaccessibility of the first random number.

The second terminal receives the first random number and the CA certificate of the first terminal, generates the second random number, authenticates the CA certificate of the first terminal, and after successful authentication, obtains the first terminal public key, signs the first random number using the second terminal private key to generate the first signature information, and encrypts the second random number using the first terminal public key to generate the second random number ciphertext, and sends the first negotiation information to the first terminal, in which the first negotiation information includes at least the CA certificate of the second terminal, the first signature information and the second random number ciphertext.

The second random number may be generated by the second terminal based on an external random noise signal or may be generated based on an internal random number generator, which ensures the external inaccessibility of the second random number. The second terminal obtains the first terminal public key based on the CA certificate of the first terminal and encrypts the second random number using the first terminal public key. The second random number ciphertext generated by encrypting the second random number using the first terminal public key can only be decrypted with the first terminal private key, and the first terminal private key is stored inside the first terminal security chip and cannot be obtained externally, thus ensuring the security of the second random number.

The first terminal receives the first negotiation data and authenticates the CA certificate of the second terminal. After successful authentication, the first signature information is verified based on the second terminal public key. After successful verification, the second random number ciphertext is decrypted using the first device private key to obtain the second random number, and the second random number is signed using the first device private key to generate the second signature information. The first terminal generates the third random number and encrypts the third random number using the second device public key to obtain the third random number ciphertext, obtains the transmission private key based on the second random number and the third random number and according to the first preset algorithm, and sends the second negotiation information to the second terminal, in which the second negotiation information includes at least the second signature information and the third random number ciphertext.

The first terminal authenticates the identity of the second terminal based on the second terminal public key to ensure the legality of the second terminal. After successful authentication, the first terminal decrypts the second random number ciphertext using its own private key to obtain the second random number and generates the third random number, and obtains the transmission private key based on the second random number and the third random number according to the first preset algorithm. The third random number may be generated by the first terminal based on an external random noise signal or may be generated based on an internal random number generator, which ensures the external inaccessibility of the third random number. The third random number is encrypted using the second terminal public key. Since the third random number ciphertext generated by encrypting the third random number using the second terminal public key can only be decrypted with the second terminal private key, and the second terminal private key is stored inside the second terminal security chip and cannot be obtained externally, the security of the third random number is guaranteed.

The second terminal receives the second negotiation data, and performs verification operation on the second signature information based on the first terminal public key, and after successful verification, decrypts the third random number ciphertext using the second terminal private key to obtain the third random number, and obtains the transmission private key based on the second random number and the third random number according to the first preset algorithm. The second terminal generates the transmission private key generation feedback information and sends the transmission private key generation feedback information to the first terminal.

The second terminal decrypts the third random number ciphertext using its own private key to obtain the third random number, and obtains the transmission private key based on the second random number and the third random number according to the first preset algorithm. Since both the first terminal and the second terminal obtain the transmission private key based on the second random number and the third random number according to the first preset algorithm, both sides obtain the same transmission private key through negotiation without sending out the transmission private key, avoiding the leakage of the transmission private key during communication, and improving the security of the communication.

The first terminal receives the transmission private key generation feedback information, generates the threshold phase difference $\Delta\varphi$ and encrypts the threshold phase difference $\Delta\varphi$ using the transmission private key to generate the threshold phase difference ciphertext, and sends the threshold phase difference ciphertext to the second terminal.

The first terminal generates the threshold phase difference $\Delta\varphi$ and encrypts the threshold phase difference $\Delta\varphi$ using the transmission private key to generate the threshold phase difference ciphertext. The transmission private key is obtained by both the first terminal and the second terminal based on the second random number and the third random number according to the first default algorithm, and the transmission private key exists only inside the first terminal and the second terminal and cannot be obtained externally, thus ensuring the security of threshold phase difference $\Delta\varphi$.

The second terminal receives the threshold phase difference ciphertext, decrypts the threshold phase difference ciphertext using the transmission private key, and obtains and stores the threshold phase difference $\Delta\varphi$.

The second terminal decrypts the threshold phase difference ciphertext using the transmission private key, and obtains and stores the threshold phase difference $\Delta\varphi$, realizing the threshold phase difference $\Delta\varphi$ negotiation between the first terminal and the second terminal, while ensuring the security of the negotiation process.

Solution 3:

The first terminal generates the first random number and sends the first random number and the CA certificate of the first terminal to the second terminal.

The first random number may be generated by the first terminal based on an external random noise signal or may be generated based on an internal random number generator, which ensures the external inaccessibility of the first random number.

The second terminal receives the first random number and the CA certificate of the first terminal, generates $\Delta\varphi2$, authenticates the CA certificate of the first terminal, and after successful authentication, obtains the first terminal public key, signs the first random number using the second terminal private key to generate the first signature information, encrypt $\Delta\varphi2$ using the first terminal public key to obtain $\Delta\varphi2$ ciphertext, and sends the first negotiation information to the first terminal in which the first negotiation information includes at least the CA certificate of the second terminal, the first signature information and $\Delta\varphi2$ ciphertext.

$\Delta\varphi2$ may be generated by the second terminal based on an external random noise signal or may be generated based on an internal random number generator, which ensures the external inaccessibility of $\Delta\varphi2$. The second terminal obtains the first terminal public key based on the CA certificate of the first terminal and encrypts $\Delta\varphi2$ using the first terminal public key. $\Delta\varphi2$ ciphertext generated by encrypting $\Delta\varphi2$ using the first terminal public key can only be decrypted with the first terminal private key, and the first terminal private key is stored inside the first terminal security chip, and cannot be obtained externally, thus ensuring the security of $\Delta\varphi2$.

The first terminal receives the first negotiation data and authenticates the CA certificate of the second terminal. After successful authentication, the first signature information is verified based on the second terminal public key. After successful verification, $\Delta\varphi2$ ciphertext is decrypted using the first device private key to obtain $\Delta\varphi2$, and $\Delta\varphi2$ is signed by using the first device private key to generate the second signature information. The first terminal generates $\Delta\varphi1$ and encrypts $\Delta\varphi1$ using the second device public key to obtain $\Delta\varphi1$ ciphertext. Based on $\Delta\varphi1$ and $\Delta\varphi2$, the threshold phase difference $\Delta\varphi$ is obtained according to the second preset algorithm, and the second negotiation information is sent to the second terminal, in which the second negotiation information includes at least the second signature information and $\Delta\varphi1$ ciphertext.

The first terminal authenticates the identity of the second terminal based on the second terminal public key, which ensures the legality of the second terminal. After successful authentication, the first terminal decrypts $\Delta\varphi2$ ciphertext with its own private key to obtain $\Delta\varphi2$, generate $\Delta\varphi1$ and obtains the threshold phase difference $\Delta\varphi$ based on $\Delta\varphi1$ and $\Delta\varphi2$ according to the second preset algorithm. $\Delta\varphi1$ may be generated by the first terminal based on an external random noise signal or may be generated based on an internal random number generator, which ensures the external inaccessibility of $\Delta\varphi1$. $\Delta\varphi1$ is encrypted using the second terminal public key. $\Delta\varphi1$ ciphertext generated through encryption with the second terminal public key can only be decrypted with the second terminal private key, and the second terminal private key is stored inside the second terminal security chip and cannot be obtained by the outside, thus ensuring the security of $\Delta\varphi1$.

The second terminal receives the second negotiation data, and performs verification operation on the second signature information based on the first terminal public key, and after successful verification, decrypts $\Delta\varphi1$ ciphertext with the second terminal private key to obtain $\Delta\varphi1$, and obtains the threshold phase difference $\Delta\varphi$ based on $\Delta\varphi1$ and $\Delta\varphi2$ according to the second preset algorithm.

The second terminal decrypts $\Delta\varphi1$ ciphertext with its private key to obtain $\Delta\varphi1$, and obtains the threshold phase difference $\Delta\varphi$ based on $\Delta\varphi1$ and $\Delta\varphi2$ according to the second preset algorithm. Since the first terminal and the second terminal each obtains the threshold phase difference $\Delta\varphi$ based on $\Delta\varphi1$ and $\Delta\varphi2$ according to the second preset algorithm, both sides obtain the same threshold phase difference $\Delta\varphi$ through negotiation and do not need to send out the threshold phase difference Δφ, avoiding the leakage of the threshold phase difference Δφ in the communication process, and improving the security of the communication.

With the negotiation process of the threshold phase difference Δφ, the security of the threshold phase difference Δφ can be guaranteed, which protects the threshold phase difference Δφ from being obtained by the outside. Further, the negotiation process of the threshold phase difference Δφ can be repeated before each information exchange, thus further ensuring the security of the threshold phase difference Δφ.

Optionally, the communication mode adopted by the first terminal and the second terminal includes a short-range wireless communication mode, wherein, the short-range wireless communication mode may include the following communication protocols: Bluetooth communication protocol, infrared IrDA communication protocol. RFID communication protocol, ZigBee communication protocol, Ultra WideBand communication protocol, NFC communication protocol, WiMedia communication protocol, GPS communication protocol DECT communication protocol, wireless 1394 communication protocol and special wireless communication protocol, and of course, the following communication protocols that may appear in the future are equivalent to the above communication protocols: the time required for data propagation over the maximum transmission distance supported by the communication protocol is less than the time required for the data to be tampered with by external devices.

It can be seen from above that, with the data communication method provided in the present embodiment, the first terminal begins to detect the first phase difference between the waveform phase of the communication carrier signal and the first initial phase when completing sending the data packet to be processed, and receives the reply packet only when the first phase difference is within the threshold range, and the second terminal begins to detect the second phase difference between the waveform phase of the communication carrier signal and the second initial phase when the second terminal completes receiving the data packet to be processed, and sends the reply packet only when the second phase difference reaches the threshold phase difference Δφ. Therefore, simultaneous receiving and sending through detecting the phase difference greatly improves the timekeeping accuracy of the two parties, thus ensuring that the first terminal and the second terminal receive and send reply packets only at very precise moment. That is, even if the reply packet sent by the second terminal to the first terminal is intercepted by a third party during the transmission, the first terminal has already terminated the communication process when the data tampered by the third party reaches the first terminal, this is because tampering with the data by the third party costs milliseconds, which is far greater than the timekeeping precision of the first terminal, and the first terminal immediately stops the communication if not receiving the reply packet at the particular moment. Thus, the risk of data received by the first terminal being altered externally during transmission is prevented and the reliability of the reply packet received by the first terminal is increased. In addition, Δφ≥ω can guarantee that the second terminal can complete the processing operation of the data packet to be processed and generate the reply packet before being required to send the reply packet. Δφ≤λ can make the communication method compatible with the existing communication protocols.

Embodiment 2

Based on the same invention concept, embodiments of the present disclosure also provide a data communication system. As illustrated in FIG. 2, the data communication system includes a first terminal and a second terminal, and the first terminal and the second terminal perform the data communication method in Embodiment 1.

The first terminal keeps generating communication carrier signals during the communication between the first terminal and the second terminal. The first terminal is configured to: send a communication data signal carrying a data packet to be processed, and to begin to detect a first phase difference between a waveform phase of the communication carrier signal with a first initial phase when the first terminal completes sending the data packet to be processed. The first initial phase is the waveform phase of the communication carrier signal when the first terminal completing sending the data packet to be processed. The communication data signal is obtained by the first terminal by means of modulating the data packet to be processed onto the communication carrier signal. The second terminal is configured to: receive the communication data signal carrying the data packet to be processed, to begin to detect a second phase difference between the waveform phase of the communication carrier signal and a second initial phase when the second terminal completes receiving the data packet to be processed, and to generate a reply packet based on the data packet to be processed, wherein, the second initial phase is the waveform phase of the communication carrier signal when the second terminal completes receiving the data packet to be processed. The second terminal is further configured to send the reply packet to the first terminal when the detecting that second phase difference reaches a threshold phase difference Δφ. The first terminal is further configured to allow to start receiving the reply packet when detecting that the first phase difference is within a threshold range, wherein the threshold range is obtained by the first terminal based on the threshold phase difference Δφ.

Optionally, the first terminal is further configured to generate a communication request and send the communication request to the second terminal. The second terminal is further configured to receive the communication request, generate a first negotiation data packet based on the communication request, and send the first negotiation data packet to the first terminal. The first terminal is further configured to receive the first negotiation data and authenticate the second terminal based on the first negotiation data, generate a second negotiation data packet after successful authentication, and send the second negotiation data packet to the second terminal. The second terminal is further configured to receive the second negotiation data packet and authenticate the first terminal based on the second negotiation data packet, generate the threshold phase difference Δφ after successful authentication, encrypt the threshold phase difference Δφ to obtain the threshold phase difference ciphertext, and send the threshold phase difference ciphertext to the first terminal. Δφ≤λ, in which λ is a phase variation value of the communication carrier signal generated within the frame waiting time specified in the communication protocol adopted by the first terminal and the second terminal. The first terminal is further configured to receive and decrypt the threshold phase difference ciphertext to obtain the threshold phase difference Δφ, and store the threshold phase difference Δφ.

Optionally, the threshold phase difference Δφ is stored in the preset factory information of the first terminal and the second terminal. Δφ≤λ, in which λ is a phase variation value generated by the communication carrier signal within the frame waiting time specified in the communication protocol adopted by the first terminal and the second terminal.

Optionally, the first terminal exchanges data with the second terminal based on the phase communication protocol. The phase communication protocol is a communication protocol in which the transmission data includes at least the threshold phase difference $\Delta\varphi$, or a communication protocol in which the transmission data includes at least the threshold phase difference $\Delta\varphi$ and the tamper-resistant check value, in which, the tamper-resistant check value is used for checking the threshold phase difference $\Delta\varphi$.

The threshold phase difference $\Delta\varphi$ is generated by the first terminal based on $\omega$, and $\Delta\varphi \geq \omega$, wherein, $\omega$ is a phase variation value generated by the communication carrier signal within the predetermined completion time for the second terminal to process the received data sent by the first terminal.

Alternatively, the threshold phase difference $\Delta\varphi$ is generated by negotiation between the first terminal and the second terminal, wherein, the negotiation process includes: the first terminal generating $\Delta\varphi$ and sending $\Delta\varphi$ to the second terminal, and the second terminal sending a response message to the first terminal after successful authentication to the first terminal; or, the second terminal generating $\Delta\varphi$ and sending $\Delta\varphi$ to the first terminal, and the first terminal sending a response message to the second terminal after successful authentication to the second terminal; or, the first terminal generating $\Delta\varphi 1$ and sending $\Delta\varphi 1$ to the second terminal, the second terminal generating $\Delta\varphi 2$ and sending $\Delta\varphi 2$ to the first terminal, and both the first terminal and the second terminal generating $\Delta\varphi$ using $\Delta\varphi 1$ and $\Delta\varphi 2$ based on the same algorithm.

Optionally, the communication mode used between the first terminal and the second terminal includes a short-range wireless communication mode.

Optionally, the threshold range is [$\Delta\varphi$, $\Delta\varphi+2\theta$], wherein $\Delta\varphi+2\theta$ less than or equal to $\lambda$, $\lambda$ is the phase variation value generated by the communication carrier signal over the frame waiting time specified in the communication protocol adopted by the first terminal and the second terminal, and $\theta$ is the phase variation value generated by the communication carrier signal over the maximum communication distance supported by the communication mode adopted by the first terminal and the second terminal.

According to the above contents, with the data communication system provided by the present embodiment, the first terminal 201 begins to detect the first phase difference between the waveform phase of the communication carrier signal and the first initial phase when the first terminal 201 completes sending the data packet to be processed, and receives the reply packet only when the first phase difference is within the threshold range; and the second terminal 202 begins to detect the second phase difference between the waveform phase of the communication carrier signals and the second initial phase when the second terminal 202 completes receiving the data packet to be processed, and sends the reply packet only when the second phase difference reaches the threshold phase difference $\Delta\varphi$. Therefore, simultaneous reception and sending through detecting the phase difference greatly improves the timekeeping accuracy of the two parties, thus ensuring that the first terminal 201 and the second terminal 202 receive and send the reply packet only at very precise moment. That is, even if the reply packet sent by the second terminal 202 to the first terminal 201 is intercepted by a third party during the transmission, the first terminal 201 has already terminated the communication process when the data tampered by the third party reaches the first terminal 201, this is because tampering with the data by the third party costs milliseconds, which is far greater than the timekeeping accuracy of the first terminal 201, and the first terminal 201 immediately stops the communication if not receiving the reply packet at the particular moment. Thus, the risk of data received by the first terminal 201 being altered externally during transmission is prevented and the reliability of the reply packet received by the first terminal 201 is increased. In addition, $\Delta\varphi \geq \omega$ can guarantee that the second terminal 202 can complete the processing operation of the data packet to be processed and generate the reply packet before being required to send the reply packet. $\Delta\varphi \leq \lambda$ can make the communication method compatible with the existing communication protocols.

Embodiment 3

The present embodiment provides a data communication method in which the first terminal keeps generating communication carrier signals during the communication between the first terminal and the second terminal. In communication technology, the communication carrier signal is an electric wave generated by an oscillator and transmitted over a communication channel, which is modulated and used to send data. In this embodiment, the communication carrier signal is generated by the first terminal as a carrier for transmitting data information. In the present embodiment, the first terminal and the second terminal may be any device capable of data interactive communication. Optionally, the first terminal may be a reader, such as a card reader, a computer, a mobile phone, a router, a vehicle-mounted device, a server, etc. The second terminal may be a transponder, such as a smart card, an ID card, an intelligent cipher device, a mobile phone, a computer, a router, a smart home, a wearable device, etc.

Figure 4:
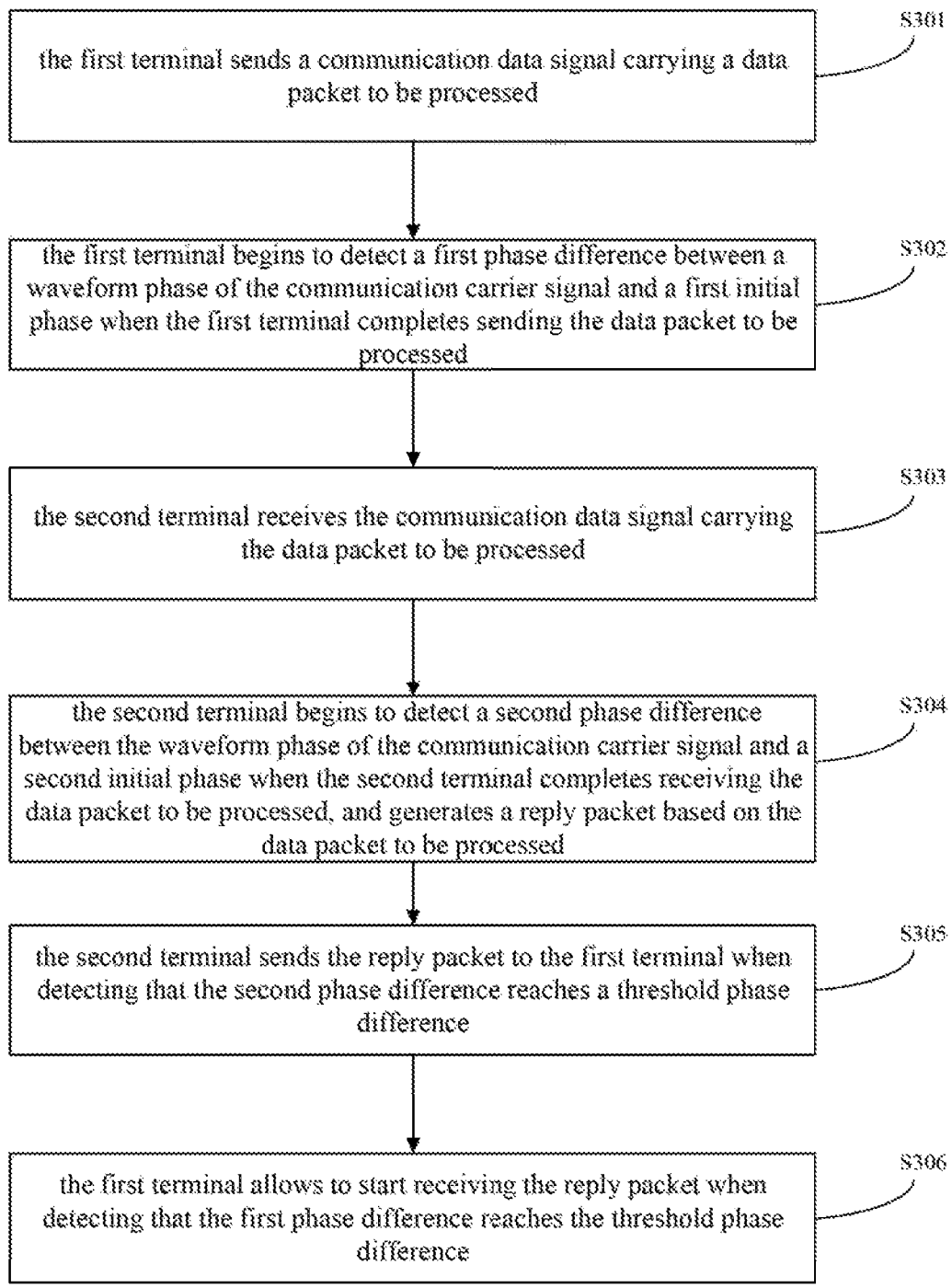
FIG. 4 is a flow chart of a data communication method provided in embodiment 3 of the present disclosure.

As illustrated in FIG. 4, the following steps are included.

At S301, the first terminal sends a communication data signal carrying a data packet to be processed.

In detail, reference may be made to the corresponding description in step S101 in embodiment 1.

At S302, the first terminal begins to detect a first phase difference of a waveform phase of the communication carrier signal with respect to a first initial phase, in which, the first initial phase is the waveform phase of the communication carrier signal when the first terminal completes sending the data packet to be processed.

In detail, reference may be made to the corresponding description in step S102 in embodiment 1.

At S303, the second terminal receives the communication data signal carrying the data packet to be processed.

In detail, reference may be made to the corresponding description in step S103 in embodiment 1.

At S304, when the second terminal completes receiving the data packet to be processed, the second terminal begins to detect a second phase difference between the waveform phase of the communication carrier signal and a second initial phase, and generates a reply packet based on the data packet to be processed, wherein, the second initial phase is the waveform phase of the communication carrier signal when the second terminal completes receiving the data packet to be processed.

In detail, reference may be made to the corresponding description in step S104 in embodiment 1.

At S305, when the second phase difference reaches a threshold phase difference $\Delta\varphi$, the second terminal sends the reply packet to the first terminal.

In detail, reference may be made to the corresponding description in step S105 in embodiment 1.

At S306, when the first phase difference reaches the threshold phase difference Δφ, the first terminal is allowed to begin to receive the reply packet.

In the present embodiment, the communication mode used between the first terminal and the second terminal includes a short-range wireless communication mode, wherein, the short-range wireless communication mode may include the following communication protocols: Bluetooth communication protocol, Infrared IrDA communication protocol, RFID communication protocol, ZigBee communication protocol, Ultra WideBand communication protocol, NFC communication protocol, WiMedia communication protocol, GPS communication protocol, DECT communication protocol, wireless 1394 communication protocol and specialized wireless communication protocol. When using the short-range wireless communication mode mentioned above. The distance between the first terminal and the second terminal is negligible relative to the transmission distance of the data signal in the unit time. For example, the Bluetooth communication protocol is adopted, the distance between the first terminal and the second terminal is less than 10 meters, the data between the first terminal and the second terminal is transmitted wirelessly at light speed, then, in this short-range wireless communication mode, the data transmission time between the first terminal and the second terminal is extremely short, about 30 ns, which is negligible. That is, the second terminal can receive the data packet immediately after the first terminal sends the data packet, and when the first terminal receives the reply packet sent out by the second terminal once detecting that the second phase difference reaches the threshold phase difference Δφ, the first phase difference detected by the first terminal is also Δφ; the first terminal is allowed to start receiving the reply packet only when the first phase difference reaches the threshold phase difference Δφ, otherwise, the first terminal is not allowed to receive data information sent from external, which greatly improves the reliability of the received reply packets. In the process of data communication, the first terminal and the second terminal receive and send data simultaneously by detecting the phase difference, which greatly enhances the timekeeping accuracy of the two parties, thereby ensuring that the first terminal and the second terminal receive and send the reply packet only at very precise moment. Even if the reply packet sent by the second terminal to the first terminal is intercepted by a third party during the transmission, the first terminal has already terminated the communication process when the data tampered by the third party reaches the first terminal, this is because tampering with the data by the third party costs milliseconds, which is far greater than the timekeeping accuracy of the first terminal, and the first terminal immediately stops the communication process when not receiving the reply packet at the particular moment. Therefore, the risk of data received by the first terminal being altered externally during transmission is prevented and the reliability of the reply packet received by the first terminal is increased.

Optionally, before the first terminal sends the communication data signal carrying the data packet to be processed at step S301, step S301 also includes the step of the threshold phase difference negotiation between the first terminal and the second terminal. Specifically, reference may be made to the specific implementation as illustrated in FIG. 2 in the embodiment 1.

According to the above contents, with the data communication method provided in the present embodiment, the first terminal begins to detect the first phase difference between the waveform phase of the communication carrier signals and the first initial phase when completing sending the data packet to be processed, and receives the reply packet only when the first phase difference reaches the threshold phase difference Δφ; and the second terminal begins to detect the second phase difference between the waveform phase of the communication carrier signal and the second initial phase when the second terminal completes receiving the data packet to be processed, and sends the reply packet only when the second phase difference reaches the threshold phase difference Δφ. Therefore, simultaneous receiving and sending by means of detecting the phase difference greatly improves the timekeeping accuracy of the two parties, thus ensuring that the first terminal and the second terminal receive and send the reply packet only at very precise moment. That is, even if the reply packet sent by the second terminal to the first terminal is intercepted by a third party during the transmission, the first terminal has already terminated the communication process when the data tampered by a third party reaches the first terminal, this is because tampering with the data by the third party costs milliseconds, which is far greater than the timekeeping accuracy of the first terminal, and the first terminal immediately stops the communication process if not receiving the reply packet at the particular moment. Thus, the risk of the data received by the first terminal being tampered by the outside during the transmission process is eliminated, and the reliability of the reply packet received by the first terminal is greatly enhanced. In addition, Δφ≥ω guarantees that the second terminal can complete the processing operation of the data packet to be processed and generate the reply packet before being required to send the reply packet. Δφ≤λ can make the communication method compatible with the current communication protocols.

Embodiment 4

Figure 3:
FIG. 3 is a block diagram of a data communication system provided in embodiment 2 of the present disclosure.

Based on the same invention conception, embodiments of the present disclosure also provide a data communication system. Reference may be made to the block diagram of the data communication system illustrated in FIG. 3. The data communication system may include the first terminal and the second terminal, the first terminal and the second terminal performing the data communication method as in embodiment 3.

The first terminal keeps generating communication carrier signals during the communication between the first terminal and the second terminal. The first terminal is configured to: send a communication data signal carrying a data packet to be processed, and begin to detect the first phase difference between the waveform phase of the communication carrier signal and the first initial phase when the first terminal completes sending the data packet to be processed, in which the first initial phase is the waveform phase of the communication carrier signal when the first terminal completes sending the data packet to be processed. The communication data signal is obtained by the first terminal through modulating the data packet to be processed onto the communication carrier signal. The second terminal is configured to: receive the communication data signal carrying the data packet to be processed begin to detect the second phase difference between the waveform phase of the communication carrier signal and the second initial phase when the second terminal completes receiving the data packet to be processed, and generate the reply packet based on the data packet to be processed, wherein, the second initial phase is the waveform phase of the communication carrier signal when the second terminal completes receiving the packet to be processed. The second terminal is further configured to send the reply packet to the first terminal when detecting that the second phase difference reaches the threshold phase difference $\Delta\varphi$. The first terminal is further configured to allow to start receiving the reply packet when detecting that the first phase difference reaches the threshold phase difference $\Delta\varphi$.

Optionally, the first terminal is further configured to generate a communication request and send the communication request to the second terminal; the second terminal is further configured to receive the communication request, generate a first negotiation data packet based on the communication request, and send the first negotiation data packet to the first terminal; the first terminal is further configured to receive the first negotiation data and authenticate the second terminal based on the first negotiation data, generate a second negotiation data packet after successful authentication, and send the second negotiation data packet to the second terminal; the second terminal is further configured to receive the second negotiation data packet and authenticate the first terminal based on the second negotiation data packet, generate the threshold phase difference $\Delta\varphi$ after successful authentication, encrypt the threshold phase difference $\Delta\varphi$ to obtain the threshold phase difference ciphertext, and send the threshold phase difference ciphertext to the first terminal, in which $\Delta\varphi \leq \lambda$, $\lambda$ is a phase variation value of the communication carrier signal generated within the frame waiting time specified in the communication protocol adopted by the first terminal and the second terminal; the first terminal is further configured to receive and decrypt the threshold phase difference ciphertext to obtain the threshold phase difference $\Delta\varphi$, and store the threshold phase difference $\Delta\varphi$.

Optionally, the threshold phase difference $\Delta\varphi$ is stored in the preset factory information of the first terminal and the second terminal. $\Delta\varphi \leq \lambda$, in which $\lambda$ is a phase variation value of the communication carrier signal generated within the frame waiting time specified in the communication protocol adopted by the first terminal and the second terminal.

Optionally, the first terminal performs data interaction with the second terminal based on the phase communication protocol. The phase communication protocol is a communication protocol in which transmission data includes at least the threshold phase difference $\Delta\varphi$, or the phase communication protocol is a communication protocol in which the transmission data includes at least the threshold phase difference $\Delta\varphi$ and the tamper-resistant check value. The tamper-resistant check value is used for checking the threshold phase difference $\Delta\varphi$.

The threshold phase difference $\Delta\varphi$ is generated by the first terminal based on $\omega$, and $\Delta\varphi \geq \omega$, wherein, $\omega$ is a phase variation value of the communication carrier signal generating within the predetermined completion time for the second terminal to process the received data sent by the first terminal.

Alternatively, the threshold phase difference $\Delta\varphi$ is generated by negotiation between the first terminal and the second terminal, wherein, the negotiation includes: the first terminal generating $\Delta\varphi$ and sending $\Delta\varphi$ to the second terminal, and the second terminal sending a response message to the first terminal after successful authentication to the first terminal; or, the second terminal generating $\Delta\varphi$ and sending to the first terminal, and the first terminal sending a response message to the second terminal after successful authentication to the second terminal; or, the first terminal generating $\Delta\varphi 1$ and sending $\Delta\varphi 1$ to the second terminal, the second terminal generating $\Delta\varphi 2$ and sending $\Delta\varphi 2$ to the first terminal, and both the first terminal and the second terminal generating $\Delta\varphi$ using $\Delta\varphi 1$ and $\Delta\varphi 2$, according to the same algorithm.

Any procedure or method described in the flow charts or described in any other way herein may be understood include one or more modules, portions or pans for executing instruction codes that implement steps of a custom logic function or procedure. And preferable embodiments of the present disclosure includes other implementation, in which the order of execution is different from that which is depicted or discussed, including executing functions in a substantially simultaneous manner or in an opposite order according to the related functions, which may be understood by the skilled in the art of embodiments of the present disclosure.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an Application Specific Integrated Circuit having appropriate combinational logic gates, a Programmable Gate Array(s) (PGA), a Field Programmable Gate Array (FPGA), etc.

The common technical personnel in the field may understand that all or some steps in the above embodiment may be completed by the means that relevant hardware is instructed by a program. The programs may be stored in a computer readable storage medium, and the programs include any one or combination of the steps in embodiments when being executed.

In addition, respective function units in respective embodiments of the present disclosure may be integrated in a processing unit, and respective unit may further exist physically alone, and two or more units may further be integrated in a unit. The foregoing integrated unit may be implemented either in the forms of hardware or software. If the integrated module is implemented as a software functional module and is sold or used as a stand-alone product, it may be stored in a computer readable storage medium.

The above-mentioned storage medium may be a ROM, a magnetic disk or a disk and the like.

In the description of the present disclosure, reference throughout this specification to "an embodiment," "some embodiments," "an example," "a specific example," or "some examples," means that a particular feature, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, or characteristics may be combined in any suitable manner in one or more embodiments or examples.

Although embodiments of the present disclosure have been shown and described above, it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure. The scope of the present disclosure is limited by claims and their equivalents.

What is claimed is:

1. A data communication method, wherein, a first terminal continuously generates communication carrier signals during communication with a second terminal, the method comprises:

the first terminal sending a communication data signal carrying a data packet to be processed, and the first terminal beginning to detect a first phase difference between a waveform phase of the communication carrier signal and a first initial phase when the first terminal completes sending the data packet to be processed, wherein the first initial phase is the waveform phase of the communication carrier signal when the first terminal completes sending the data packet to be processed, and the communication data signal is obtained by the first terminal by means of modulating the data packet to be processed onto the communication carrier signal;

the second terminal receiving the communication data signal carrying the data packet to be processed, and the second terminal beginning to detect a second phase difference between the waveform phase of the communication carrier signal and a second initial phase when the second terminal completes receiving the data packet to be processed, and generating a reply packet based on the data packet to be processed, wherein the second initial phase is the waveform phase of the communication carrier signal when the second terminal completes receiving the data packet to be processed;

the second terminal sending the reply packet to the first terminal when detecting that the second phase difference reaches a threshold phase difference $\Delta\varphi$; and the first terminal allowing to start receiving the reply packet when detecting that the first phase difference is within a threshold range, wherein the threshold range is obtained by the first terminal based on the threshold phase difference $\Delta\varphi$;

wherein, the threshold phase difference $\Delta\varphi$ is stored in preset factory information of the first terminal and the second terminal, wherein $\Delta\varphi \leq \lambda$, $\lambda$ is a phase variation value of the communication carrier signal generated within a frame waiting time specified in a communication protocol adopted by the first terminal and the second terminal.

2. The method according to claim 1, wherein, before the first terminal sends the communication data signal carrying the data packet to be processed, the method further comprises:

the first terminal generating a communication request and sending the communication request to the second terminal;

the second terminal receiving the communication request, generating a first negotiation data packet based on the communication request, and sending the first negotiation data packet to the first terminal;

the first terminal receiving the first negotiation data packet, authenticating the second terminal based on the first negotiation data packet, generating a second negotiation data packet after successful authentication, and sending the second negotiation data packet to the second terminal;

the second terminal receiving the second negotiation data packet, authenticating the first terminal based on the second negotiation data packet, generating the threshold phase difference $\Delta\varphi$ after successful authentication, encrypting the threshold phase difference $\Delta\varphi$ to obtain a threshold phase difference ciphertext, and sending the threshold phase difference ciphertext to the first terminal, wherein $\Delta\varphi \leq \lambda$, $\lambda$ is a phase variation value of the communication carrier signal generated within a frame waiting time specified in a communication protocol adopted by the first terminal and the second terminal; and the first terminal receiving and decrypting the threshold phase difference ciphertext, to obtain and store the threshold phase difference $\Delta\varphi$.

3. The method according to claim 1, wherein, the first terminal and the second terminal perform data interaction based on a phase communication protocol, the phase communication protocol is a communication protocol in which transmission data comprises at least the threshold phase difference $\Delta\varphi$ or a communication protocol in which the transmission data comprises at least the threshold phase difference $\Delta\varphi$ and a tamper-resistant check value, wherein the tamper-resistant check value is configured to perform check operation on the threshold phase difference $\Delta\varphi$;

the threshold phase difference $\Delta\varphi$ is generated by the first terminal based on $\omega$, and $\Delta\varphi \geq \omega$, wherein $\omega$ is a phase variation value of the communication carrier signal generated within a predetermined completion time in which the second terminal processes received data sent by the first terminal, or the threshold phase difference $\Delta\varphi$ is generated by the first terminal and the second terminal through negotiation, wherein, the negotiation process comprises: the first terminal generating $\Delta\varphi$ and sending $\Delta\varphi$ to the second terminal, the second terminal sending a response message to the first terminal after successful authentication to the first terminal; or, the second terminal generating $\Delta\varphi$ and sending $\Delta\varphi$ to the first terminal, and the first terminal sending a response message to the second terminal after successful authentication to the second terminal; or, the first terminal generating $\Delta\varphi 1$ and sending $\Delta\varphi 1$ to the second terminal, the second terminal generating $\Delta\varphi 2$ and sending $\Delta\varphi 2$ to the first terminal, and both the first terminal and the second terminal generating $\Delta\varphi$ using $\Delta\varphi 1$ and $\Delta\varphi 2$ according to the same algorithm.

4. The method according to claim 1, wherein, a communication mode adopted by the first terminal and the second terminal comprises a short-range wireless communication mode.

5. The method according to claim 1, wherein, the threshold range is $[\Delta\varphi, \Delta\varphi+2\theta]$, wherein, $\Delta\varphi+2\theta$ is less than or equal to $\lambda$, and $\lambda$ is a phase variation value of the communication carrier signal generated within the frame waiting time specified in the communication protocol adopted by the first terminal and the second terminal, and $\theta$ is the phase variation value of the communication carrier signal generated over a maximum communication distance supported by the communication mode adopted by the first terminal and the second terminal.

6. The method according to claim 1, wherein, the first terminal is a reader and the second terminal is a transponder.

7. A data communication system, comprising a first terminal and a second terminal, wherein the first terminal comprises a processor and a memory having an instruction stored thereon, the first terminal is configured to generate communication carrier signal continuously during communication with the second terminal;

the first terminal is further configured to send a communication data signal carrying a data packet to be processed, and begin to detect a first phase difference between a waveform phase of the communication carrier signal and a first initial phase when the first terminal completes sending the data packet to be processed, wherein the first initial phase is the waveform phase of the communication carrier signal when the first terminal completes sending the data packet to be processed, and the communication data signal is obtained by the first terminal by means of modulating the data packet to be processed onto the communication carrier signal;

the second terminal comprises a processor and a memory having an instruction stored thereon, the second terminal is configured to receive the communication data signal carrying the data packet to be processed, and begin to detect a second phase difference between the waveform phase of the communication carrier signal and a second initial phase when the second terminal completes receiving the data packet to be processed, and generate a reply packet based on the data packet to be processed, wherein the second initial phase is the waveform phase of the communication carrier signal when the second terminal completes receiving the data packet to be processed;

the second terminal is further configured to send the reply packet to the first terminal when detecting that the second phase difference reaches a threshold phase difference $\Delta\varphi$;

the first terminal is further configured to allow to start receiving the reply packet when detecting that the first phase difference is within a threshold range, wherein the threshold range is obtained by the first terminal based on the threshold phase difference $\Delta\varphi$;

wherein, the threshold phase difference $\Delta\varphi$ is stored in preset factory information of the first terminal and the second terminal, wherein $\Delta\varphi \leq \lambda$, $\lambda$ is a phase variation value of the communication carrier signal generated within a frame waiting time specified in a communication protocol adopted by the first terminal and the second terminal.

8. A data communication method, wherein, a first terminal continuously generates communication carrier signals during communication with a second terminal, the method comprises:

the first terminal sending a communication data signal carrying a data packet to be processed, and the first terminal beginning to detect a first phase difference between a waveform phase of the communication carrier signal and a first initial phase when the first terminal completes sending the data packet to be processed, wherein the first initial phase is the waveform phase of the communication carrier signal when the first terminal completes sending the data packet to be processed, and the communication data signal is obtained by the first terminal by means of modulating the data packet to be processed onto the communication carrier signal;

the second terminal receiving the communication data signal carrying the data packet to be processed, and the second terminal beginning to detect a second phase difference between the waveform phase of the communication carrier signal and a second initial phase when the second terminal completes receiving the data packet to be processed, and generating a reply packet based on the data packet to be processed, wherein the second initial phase is the waveform phase of the communication carrier signal when the second terminal completes receiving the packet to be processed;

the second terminal sending the reply packet to the first terminal when detecting that the second phase difference reaches a threshold phase difference $\Delta\varphi$; and the first terminal allowing to start receiving the reply packet when detecting that the first phase difference reaches the threshold phase difference $\Delta\varphi$;

wherein, the threshold phase difference $\Delta\varphi$ is stored in preset factory information of the first terminal and the second terminal, wherein $\Delta\varphi \leq \lambda$, $\lambda$ is a phase variation value of the communication carrier signal generated within the frame waiting time specified in the communication protocol adopted by the first terminal and the second terminal.

9. The method according to claim 8, wherein, before the first terminal sends the communication data signal carrying the data packet to be processed, the method further comprises:

the first terminal generating a communication request and sending the communication request to the second terminal;

the second terminal receiving the communication request, generating a first negotiation data packet based on the communication request, and sending the first negotiation data packet to the first terminal;

the first terminal receiving the first negotiation data packet and authenticating the second terminal based on the first negotiation data packet, generating a second negotiation data packet after successful authentication, and sending the second negotiation data packet to the second terminal;

the second terminal receiving the second negotiation data packet and authenticating the first terminal based on the second negotiation data packet, generating the threshold phase difference $\Delta\varphi$ after successful authentication, and encrypting the threshold phase difference $\Delta\varphi$ to obtain a threshold phase difference ciphertext, and sending the threshold phase difference ciphertext to the first terminal, wherein $\Delta\varphi \leq \lambda$, $\lambda$ is a phase variation value of the communication carrier signal generated within a frame waiting time specified in a communication protocol adopted by the first terminal and the second terminal; and the first terminal receiving and decrypting the threshold phase difference ciphertext, to obtain and store the threshold phase difference $\Delta\varphi$.

10. The method according to claim 8, wherein, the first terminal performs data interaction with the second terminal based on a phase communication protocol, and the phase communication protocol is a communication protocol in which transmission data comprises at least the threshold phase difference $\Delta\varphi$ or a communication protocol in which transmission data comprises at least the threshold phase difference $\Delta\varphi$ and a tamper-resistant check value, wherein the tamper-resistant check value is configured to check the threshold phase difference $\Delta\varphi$;

the threshold phase difference $\Delta\varphi$ is generated by the first terminal based on co, and $\Delta\varphi \geq \omega$, wherein $\omega$ is a phase variation value of the communication carrier signal generated within a predetermined completion time for the second terminal to process received data sent by the first terminal, or, the threshold phase difference $\Delta\varphi$ is generated by the first terminal and the second terminal through negotiation, wherein the negotiation comprises: the first terminal generating Δφ and sending Δφ to the second terminal, and the second terminal sending a response message to the first terminal after successful authentication to the first terminal; or, the second terminal generating Δφ and sending Δφ to the first terminal, and the first terminal sending a response message to the second terminal after successful authentication to the second terminal; or, the first terminal generating Δφ and sending Δφ1 to the second terminal, and the second terminal generating Δφ2 and sending Δφ2 to the first terminal, and both the first terminal and the second terminal generating Δφ using Δφ1 and Δφ2 according to the same algorithm.

11. The method according to claim 8, wherein, a communication mode adopted by the first terminal and the second terminal comprises a short-range wireless communication mode.

12. The method according to claim 8, wherein the first terminal is a reader and the second terminal is a transponder.

13. The data communication system according to claim 7, wherein, before the first terminal sends the communication data signal carrying the data packet to be processed,
the first terminal is further configured to generate a communication request and sending the communication request to the second terminal;
the second terminal is further configured to receive the communication request, generate a first negotiation data packet based on the communication request, and send the first negotiation data packet to the first terminal;
the first terminal is further configured to receive the first negotiation data packet, authenticate the second terminal based on the first negotiation data packet, generate a second negotiation data packet after successful authentication, and send the second negotiation data packet to the second terminal;
the second terminal is further configured to receive the second negotiation data packet, authenticate the first terminal based on the second negotiation data packet, generate the threshold phase difference Δφ after successful authentication, encrypt the threshold phase difference Δφ to obtain a threshold phase difference ciphertext, and send the threshold phase difference ciphertext to the first terminal, wherein Δφ≤λ, λ is a phase variation value of the communication carrier signal generated within a frame waiting time specified in a communication protocol adopted by the first terminal and the second terminal; and
the first terminal is further configured to receive and decrypt the threshold phase difference ciphertext, to obtain and store the threshold phase difference Δφ.

14. The data communication system according to claim 7, wherein, the first terminal and the second terminal are configured to perform data interaction based on a phase communication protocol, the phase communication protocol is a communication protocol in which transmission data comprises at least the threshold phase difference Δφ or a communication protocol in which the transmission data comprises at least the threshold phase difference Δφ and a tamper-resistant check value, wherein the tamper-resistant check value is configured to perform check operation on the threshold phase difference Δφ;
the threshold phase difference Δφ is generated by the first terminal based on ω, and Δφ≥ω, wherein ω is a phase variation value of the communication carrier signal generated within a predetermined completion time in which the second terminal processes received data sent by the first terminal, or
the threshold phase difference Δφ is generated by the first terminal and the second terminal through negotiation, wherein, the negotiation process comprises: the first terminal generating Δφ and sending Δφ to the second terminal, the second terminal sending a response message to the first terminal after successful authentication to the first terminal; or, the second terminal generating Δφ and sending Δφ to the first terminal, and the first terminal sending a response message to the second terminal after successful authentication to the second terminal; or, the first terminal generating Δφ1 and sending Δφ1 to the second terminal, the second terminal generating Δφ2 and sending Δφ2 to the first terminal, and both the first terminal and the second terminal generating Δφ using Δφ1 and Δφ2 according to the same algorithm.

15. The data communication system according to claim 7, wherein, a communication mode adopted by the first terminal and the second terminal comprises a short-range wireless communication mode.

16. The data communication system according to claim 7, wherein, the threshold range is [Δφ, Δφ+2θ], wherein, Δφ+2θ is less than or equal to λ, and λ is a phase variation value of the communication carrier signal generated within the frame waiting time specified in the communication protocol adopted by the first terminal and the second terminal, and θ is the phase variation value of the communication carrier signal generated over a maximum communication distance supported by the communication mode adopted by the first terminal and the second terminal.

17. The data communication system according to claim 7, wherein, the first terminal is a reader and the second terminal is a transponder.

* * * * *